(12) United States Patent
Sakurai et al.

(10) Patent No.: US 6,557,414 B2
(45) Date of Patent: May 6, 2003

(54) INERTIA SENSOR AND METHOD OF FABRICATING THE SAME

(75) Inventors: Kohei Sakurai, Hitachi (JP); Masahiro Komachiya, Hitachinaka (JP); Masahiro Matsumoto, Hitachi (JP); Seikou Suzuki, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/970,710

(22) Filed: Oct. 5, 2001

(65) Prior Publication Data

US 2002/0017134 A1 Feb. 14, 2002

Related U.S. Application Data

(62) Division of application No. 09/450,267, filed on Nov. 26, 1999, now abandoned.

(30) Foreign Application Priority Data

Nov. 25, 1998 (JP) ............................................. 10-334244

(51) Int. Cl.$^7$ ............................................. G01C 19/00
(52) U.S. Cl. ................................................. 73/504.04
(58) Field of Search ....................... 73/504.02, 504.12, 73/504.03, 504.04; 438/48, 50, 52

(56) References Cited

U.S. PATENT DOCUMENTS

| 4,899,125 A | 2/1990 | Kurtz ............................. 338/2 |
| 5,349,855 A | 9/1994 | Bernstein et al. |
| 5,415,726 A | 5/1995 | Staller et al. .................. 216/2 |

FOREIGN PATENT DOCUMENTS

| EP | 0 574 143 | 12/1993 |
| JP | 5-240874 | 9/1993 |
| JP | 07120266 | 5/1995 |
| JP | 9-119942 | 5/1997 |
| JP | 9-189557 | 7/1997 |
| JP | 11-264730 | 9/1999 |

OTHER PUBLICATIONS

The Institute of Electrical Engineers of Japan, E–Department (T. IEE Japan), vol. 118–E, No. 12, 98 show.

*Primary Examiner*—Richard A. Moller
(74) *Attorney, Agent, or Firm*—Crowell & Moring LLP

(57) ABSTRACT

A sensor device has a sensing layer and an auxiliary layer for supporting the sensing layer, the two layers being superposed on each other in a laminar form. The sensing layer has a vibratory body displaceable in a direction parallel to a junction surface between the two layers. The auxiliary layer is affixed to the sensing layer and a recess or through-hole of a larger area than that of the vibratory body is formed in the auxiliary layer at a part thereof confronting the vibratory body.

21 Claims, 15 Drawing Sheets

MAGNETIC
FIELD B

INERTIA SENSOR AND METHOD OF FABRICATING THE SAME

This application is a divisional of application Ser. No. 09/450,267, filed Nov. 26, 1999, now abandoned.

BACKGROUND OF THE INVENTION

The present invention relates to an inertia sensor suitable for general use in an apparatus which controls the position and posture of a body in motion by detecting acceleration and angular velocity a method of fabricating the same and more particularly, to an inertia sensor fabricated through semiconductor fabrication process and a method of fabricating the same.

The inertia sensor, especially, an acceleration sensor and/or a rotational angular velocity sensor (gyroscope or yaw rate sensor) finds their wide demand for sensors necessary for vehicle stability control, airbag and navigation systems of a car and for prevention of unintentional movement of cameras and compact video cameras. Prior arts will be described hereunder by mainly taking an angular velocity sensor, for instance.

A variety of angular velocity sensors such as a rotary type gyroscope using a rotating sphere or top and an optical fiber gyroscope using optical fibers have hitherto been developed. The rotary type gyroscope and optical fiber gyroscope are on the one hand highly precise but on the other hand are apt to be increased in size.

Under the circumstances, with the aim of reducing the apparatus size, a vibratory gyroscope devoid of rotary body and being operative to vibrate or rock a mass body has been developed and many kinds of piezoelectric type vibratory gyroscope reduced in size by mounting a piezoelectric device on a triangle pole or cylinder have been produced. In the vibratory gyroscope, however, small parts required to be precisely assembled, facing difficulties in fabrication. Further, any of the aforementioned angular velocity sensors including the vibratory gyroscope using the triangle pole or cylinder consist of a great number of separate parts, making it difficult to make the sensor portion (sensing part) integral with the associated circuit section.

Recently, to solve these problems, study and development of a compact vibratory gyroscope has been made actively by using a micromachining technique to which the silicon semiconductor fabrication process technique is applied. Through this technique, sensors can be produced at low costs and are suitable for mass production. Further it is expected that the sensor portion and the peripheral circuit section can be incorporated in one chip. The aforementioned technical trend stands with other sensors such as acceleration sensors.

Especially for vibratory gyroscopes, various types of sensors have been proposed and discussed, but till now, less studies have been made on a sensor of simple structure (with a high sensitivity) giving importance to mass production adaptability.

The basic operational principle of the angular velocity sensor fabricated by using the micromachining technique will be described by way of example of the sensor disclosed in U.S. Pat. No. 5,349,855.

The basic principle of the angular velocity sensor is that when a mass body constantly vibrating or rotating, moves in a direction along with a first axis with an angular velocity having a rotation axis parallel to a second axis which is vertical to the first axis direction, the angular velocity can be found by detecting a Colioris' force generated in a third axis direction vertical both to the first and second axes. The Colioris' force can be known by measuring an amount of displacement of the mass body. Hereinafter, the vibrating or rotating mass body is termed as a vibratory body.

The angular velocity sensor exemplified above is constructed of a vibratory body, a support structure for supporting the vibratory body, a driver for applying drive force necessary to vibrate the vibratory body and a detector for detecting the displacement due to Colioris' force. The vibratory body is spaced apart from a substrate by means of a support beam of suitable shape and is driven electrostatically by using comb teeth electrodes. The direction of vibration is parallel to the substrate. Under this condition, when the rotation is applied to the vibratory body with the rotation axis parallel to the substrate but is vertical to the vibration direction, the vibratory body is displaced by Colioris' force in a direction vertical to the substrate. This displacement is detected as a change in electrostatic capacitance by using an electrode disposed at the bottom of the vibratory body and the substrate, thereby measuring the Colioris' force.

Examples of another angular velocity sensor fabricated by using the micromachining technique in which a drive electrode and a displacement detecting electrode are provided on a plane parallel to a substrate and a vibratory body is allowed to move on the plane only are disclosed in, for example, JP-A-09-189557 and JP-A-09-119942.

Now, the following points must considered carefully.

The provision of any of the aforementioned angular velocity sensors fabricated by using the semiconductor fabrication process presupposes a so-called surface micromachining technique in which the steps of forming a film (or player) such as insulating film and a polysilicon film on a silicon wafer and patterning the film by etching are repeated. In this case, in order to separate various structures from the substrate, the surface micromachining technique further needs a process in which a layer (sacrificial layer) that is to be extinguished in a later step is formed in advance. Layers incorporating the structures is then superposed on the sacrificial layer and the sacrificial layer is removed by etching in a final step. As a result, the vibratory body taking the form of a thin film is so formed as to be slightly spaced apart from the silicon wafer, making it difficult to cause the vibratory body to vibrate sufficiently.

On the other hand, many examples of an angular velocity sensor have been known which are fabricated by using a bulk micromachining technique, according to which, in contrast to the surface micromachining technique, a silicon wafer per se is etched by means of a device capable of working the wafer at a high aspect ratio thereby producing a structure. For example, JP-A-7-120266, JP-A-5-240874 and The Institute of Electrical Engineers of Japan, E-department (T. IEE Japan); Vol. 118-E, No. 12, '98 show the examples as above. In any of these examples, electromagnetic force is used for drive means and the sensor is comprised of a worked silicon wafer, a glass substrate and a permanent magnet. In this case, the vibratory body is so worked as to have a sufficiently large volume (mass) and therefore, vibration necessary for sensing can be caused with ease.

In the sensor fabricated by the surface micromachining technique, it is easy to corporate the sensor portion with the detection and signal processing circuits of the sensor in one chip concurrently.

The surface micromachining technique, however, includes the step of etching the sacrificial layer in the course of process and so, after the vibratory body and support means are separated from the substrate in this step, cleaning is carried out during which the vibratory body tends to affix to the substrate and the fine interdigital patterns tend to affix to each other. Therefore, in order to raise the yield, special contrivance such as a freezing dry method must be employed. Further, when considering the integration with the circuit section, a high-quality protective film devoid of defects such as pinholes is required to be prepared in advance of the etching step to prevent the circuit section from being etched. As will be seen from the above, the etching step is very laborious and time-consuming and unless being assisted by new contrivance, it cannot be suited for mass production.

Further, in the sensor fabricated by the surface micromachining technique, the distance between the substrate and the vibratory body corresponds to the thickness of the sacrificial layer and is narrow, approximately amounting up to several μm. Consequently, when the sensor is operated in the atmosphere, a large viscous resistance due to air acts on the vibratory body, raising a technical problem when we try to increase the Q value of vibration.

In the angular velocity sensor described in the aforementioned U.S. Pat. No. 5,349,855, the vibratory body is displaced by Coriolis' force in a direction vertical to the substrate and during the displacement in the direction vertical to the substrate, the vibratory body so moves as to push off air prevailing between the substrate and the vibratory body and as a result, it undergoes large dumping (squeezed film dumping).

On the other hand, in the examples described in the JP-A-09-189557 and JP-A-09-119942, the vibratory body is driven and its displacement is detected in a direction parallel to the substrate and the influence of dumping can be decreased as compared to the sensor of the aforementioned U.S. Pat. No. 5,349,855. But the gap below the vibratory body is still narrower in these examples than in the sensor fabricated by the bulk micromachining technique, with the result that the vibratory body undergoes viscous resistance which is larger by one figure to double figures or more and it is difficult for the sensor to have high sensitivity when the sensor is used in the atmosphere.

Turning to the bulk micromachining type sensor, the vibratory structure is produced by etching an about 400 to 600 μm thick silicon wafer per se and consequently, the thickness of the wafer by itself equals the thickness of the structure and the vibratory mass can be larger by about double figures in this type of sensor than in the surface micromachining type sensor. Since the Colioris' force increases in proportion to the mass as shown in equation (1), the sensitivity of the sensor can also be increased:

$$F_c = 2 \, mV\Omega \tag{1}$$

where Fc is Colioris' force, m is vibratory mass, V is vibration velocity of vibratory and Ω is angular velocity to be measured.

Further, the distance between the vibratory body and the substrate can be relatively large, amounting up to about 50 to 100 μm, a large Q value can be obtained even in the air. This also contributes to an increase in sensor sensitivity. In addition, since the etching step of the sacrificial layer can be removed in the fabrication process, this type of sensor will be fabricated more easily than the surface micromachining type sensor.

The bulk micromachining type sensor has more advantages than the surface micromachining type sensor as described above but disadvantageously, depending on the sensor structure, the sensor portion and the circuit section cannot be formed concurrently on the same chip.

Structurally, in the angular velocity sensor described in the JP-A-7-120266, the vibratory body is displaced by Colioris' force in a direction vertical to the substrate and by measuring a change in electrostatic capacitance between one electrode provided to the vibratory body and the other electrode provided to the glass substrate serving as the support member and having a recess, an amount of displacement of the vibratory body can be detected. With this construction, because of the provision of the electrode on the glass substrate, wiring is not allowed to be laid on the silicon wafer only, making it difficult to realize the sensor and circuit integrated type construction. Further, in order to wire to the electrode provided on the glass substrate, throughholes must be formed in the glass substrate, thus making the process complicated. Further, since the displacement detection direction for the vibratory body is vertical to the substrate, the viscous resistance acting on the vibratory body is more increased in this type of sensor than in the sensor in which the vibratory body is displaced in a direction parallel to the substrate. In addition, when rotational angular velocity about an axis vertical to the ground is measured as in the case of yaw rate detection in cars, the whole of the sensor must stand vertically to the ground during packaging, thus making packaging laborious and time-consuming and making irregularity in sensitivity liable to occur after packaging. Especially when a sensor for automobile application is considered, the degree of freedom of installation is limited and therefore, realization of simple and steady packaging is an important problem.

In the sensor described in the JP-A-5-240874, all components necessary for sensing, inclusive of electrodes and wiring lines, are formed on the silicon substrate but the vibratory body is vibrated by electromagnetic force in a direction vertical to the substrate, so that a coil part must be formed on the vibratory body representing the movable portion to make the process complicated. Vibration of the vibratory body vertical to the substrate decreases the sensor sensitivity, adversely affecting packaging as has been described in connection with the aforementioned JP-A-7-120266.

In many types of acceleration sensor fabricated by using the bulk micromachining technique, a displacement of the vibratory body in a direction vertical to the substrate is detected by measuring a change in electrostatic capacitance between one electrode provided to the vibratory body and the other electrode provided to the glass substrate and during fabrication, the aforementioned problem is encountered in formation of the electrode on the glass substrate as has been described previously.

On the other hand, the angular velocity sensor described in The Institute of Electrical Engineers of Japan, E-department (T. IEE Japan); Vol. 118-E, No. 12, '98 eliminates the problems in the aforementioned two known literatures and structurally, the vibratory body is driven and its displacement is detected in a direction parallel to the substrate and the magnet provided below the glass substrate is utilized effectively. But, as shown in FIG. 17, the silicon wafer constituting a sensing layer A is etched from not only its surface but also its bottom and consequently, work for turning up the wafer in the course of process is needed and a device such as a front-back aligner for bringing the bottom mask and the surface mask in line with each other is required. Further, when the wafer bottom is worked earlier than the wafer surface which is applied with patterning for formation of a vibratory body 11 and support beams 12 and patterning of wiring 21, the surface is contaminated and damaged, leading to a possibility that the wafer surface cannot be worked finely to raise a possible problem that the yield is degraded from the standpoint of mass production. Further, there needs a space D for anisotropic etching work as shown in the Figure. In addition, to permit work from the bottom to proceed, the both surfaces of the silicon wafer must be polished, raising a problem that the cost is increased as compared to the standard wafer polished on one side only and used during typical semiconductor production.

SUMMARY OF THE INVENTION

An object of the present invention is to provide an inertia sensor having high sensor sensitivity and construction suitable for high mass production adaptability and a method of fabricating the same.

Another object of the invention is to provide an inexpensive inertia sensor of high mass production adaptability which is fabricated by using the bulk micromachining technique to increase the thickness of a vibratory body and improve the sensitivity.

According to one aspect of the invention, to accomplish the above objects, an inertia sensor comprises a sensing layer and an auxiliary layer affixed to the sensing layer, wherein the sensing layer has a movable member and detection electrodes (conductors) for detecting a displacement of the movable member, the movable member is so constructed as to be displaced in a direction parallel to a junction surface between the sensing layer and the auxiliary layer, and the auxiliary layer has an opening in line with the movable member.

According to an embodiment of the invention, a sensor comprises a sensing layer and an auxiliary layer affixed to the sensing layer through a junction surface, wherein the sensing layer has a movable member displaceable in a direction parallel to the junction surface and detection electrodes (conductors) for detecting a displacement and the auxiliary layer has an opening formed on the junction surface side and having an area larger than an area which the movable member has on a plane along the junction surface.

According to another aspect of the invention, a inertia sensor comprises a sensing layer made of silicon and affixed to a glass substrate, wherein the sensing layer has a movable member and detection electrodes (conductors) for detecting a displacement of the movable member, the movable member is so constructed as to be displaceable in a direction parallel to a junction surface between the sensing layer and the glass substrate, and an opening is formed in the glass substrate in line with the movable member.

According to still another aspect of the invention, a method of fabricating an inertia sensor having a sensing layer and an auxiliary layer affixed to the sensing layer through a junction surface, wherein the method comprises the steps of providing a displacement member displaceable in a direction parallel to the junction surface and detection electrodes (conductors) for detecting a displacement of the displaceable member to form the sensing layer, providing a plate-like member and forming an opening having a larger area than that of the displaceable member in the plate-like member to form the auxiliary layer, and affixing the sensing layer and the auxiliary layer to each other such that the opening of the auxiliary layer confronts the displacement member.

According to the invention, in the displacement sensor comprising the sensing layer and the auxiliary layer affixed thereto through a junction surface, the movable member displaceable in a direction parallel to the junction surface is provided to the sensing layer and the opening in line with the movable member is formed in the auxiliary layer, so that sensor sensitivity can be improved as the mass of the movable member constituting the sensing layer increases. Further, as compared to the sensor having the opening formed in the sensing layer, the possible danger of adversely affecting the sensing layer surface by contaminating and damaging it can be reduced and a highly reliable and inexpensive inertia sensor of high mass production adaptability can be provided.

Further, by constructing the sensor such that the movable member is displaceable in a direction parallel to the junction surface between the sensing layer and the auxiliary layer, it is not required to form the structure of wiring lines and electrodes on the auxiliary layer and all components necessary for sensing, inclusive of the electrodes and wiring lines, can be provided on the sensing layer. Through this, the sensing portion can be formed integrally with its detection circuit and signal processing circuit, thereby realizing a highly reliable sensor device of simplified construction and high mass production adaptability.

In short, according to the invention, in spite of the fact that the sensor is constructed through bulk micromachining process, the main function of the sensor can be so packaged as to be concentrated to the silicon surface and therefore, even when integration of the sensing portion and the associated circuit section is considered, the compatibility of easy handling of the surface type sensor with sensitivity of the bulk type sensor can be met.

DESCRIPTION OF THE EMBODIMENTS

Preferred embodiments of an inertia sensor according to the present invention will be described in greater detail with reference to the accompanying drawings.

Figure 1:
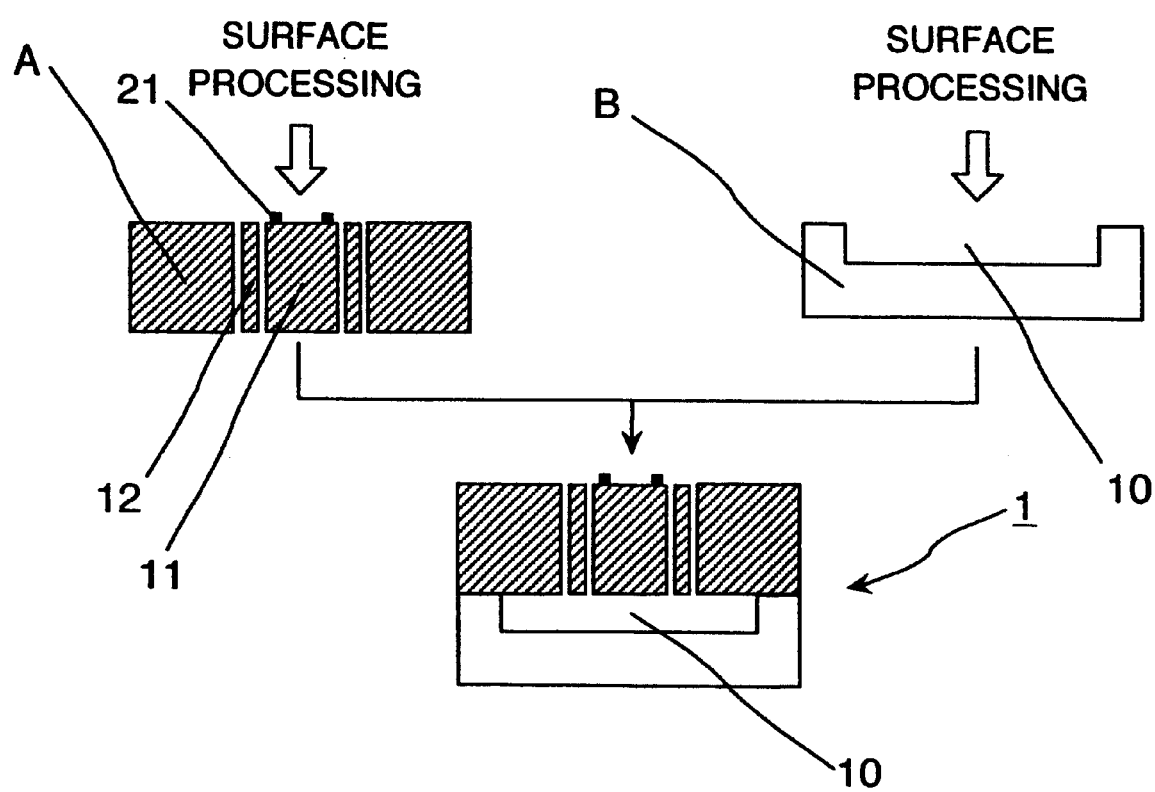
FIG. 1 is a schematic diagram showing the overall construction of an embodiment of an inertia sensor according to the invention and a method of fabricating the same.

Referring first to FIG. 1, an example of fundamental construction of an embodiment of an inertia sensor according to the present invention and a method of fabricating the inertia sensor will be described. The semiconductor sensor, generally designated by reference numeral 1, is constructed by affixing or bonding two layers to each other in a laminar form, one of the two layers being a sensing layer A which incorporates a single structure including electrodes and wiring lines, as symbolically designated by reference numeral 21, and having the function of sensing by itself and the other being an auxiliary layer B which structurally assists the sensing layer A. The "layer" referred to here means a member which is constructed independently by itself. In the case of FIG. 1, a silicon wafer and a glass substrate, for example, are both independently workable and therefore they can correspond to the sensing layer A and the auxiliary layer B, respectively. However, when working of the type in which an insulating film and a polysilicon film are formed on a silicon wafer by using the surface micromachining technique thereby providing a structure on the wafer is considered, the structure on the silicon wafer cannot be formed without resort to the silicon wafer. The single structure thus formed cannot assure sufficient mass for a vibratory body and therefore is not handled by the present invention.

In formation of the sensing layer A, electrode pads, wiring lines and a circuit section, as designated by reference numeral 21, are worked on a silicon wafer and thereafter, the thus worked wafer is applied with suitable resist. The resist is then patterned in order that the wafer can be etched, leaving a vibratory body 11, a set of beams 12 (vibratory body 11 and set of beams 12 are illustrated as being separated for explanation purpose) for supporting the vibratory body, a portion necessary for bonding to a glass substrate (auxiliary layer B) and the circuit section behind, by using a device (not shown) capable of working the wafer at a high aspect ratio.

With the glass substrate used as auxiliary layer B, an opening (recess or through-hole) 10 is formed in the glass substrate through, for example, simple and inexpensive sandblast process. The silicon wafer and the glass substrate are affixed to each other through, for example, fusion-bonding. Alternatively, an insulating material such as ceramics may be used for the auxiliary layer B.

Figure 17:
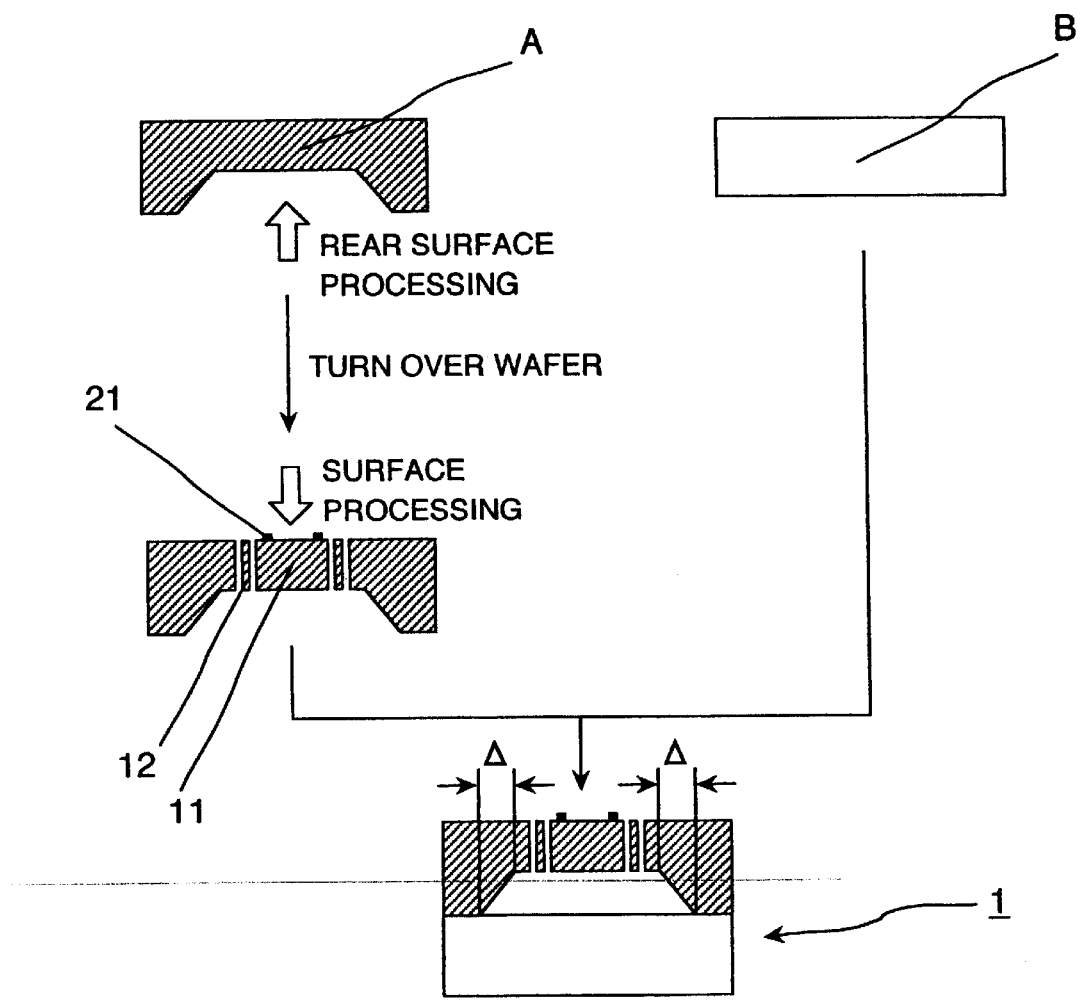
FIG. 17 is a diagram showing a conventional sensor and its fabrication process.

As will be seen from comparison with the prior art shown in FIG. 17, the silicon wafer can be dug more steeply by sandblasting than by anisotropic etching of silicon and the area of wafer occupied by a portion necessary to obtain an opening of the same area can be smaller in the present embodiment than in the prior art. Accordingly, a greater number of sensor chips can be obtained from a single wafer.

It suffices that the sensing layer A (wafer) is worked from only its surface as shown in FIG. 1 and hence the operation to turn up the wafer on the way is not needed in contrast to the prior art inertia sensor shown in FIG. 17 which is also worked from the bottom, thereby obviating the possible danger of adversely affecting the wafer by contaminating and damaging the wafer surface which is to be patterned finely. Further, in the case of the present invention in which work from the bottom is not carried out, a standard wafer polished on its surface only can be used to permit inexpensive production of sensors. The silicon wafer with its bottom unpolished and the glass substrate can be affixed to each other through fusion-bonding using low melting-point glass.

In addition, the wafer bottom is not etched to enable the original thickness of the wafer as it is to be the thickness of the vibratory body without causing the wafer to be thinned, thereby giving rise to an advantage of the invention that the mass of the vibratory body can be larger than that in the conventional inertia sensor undergoing bottom etching and consequently the sensitivity can be increased as described previously.

Of course, by roughly grinding or polishing the wafer, the silicon wafer having an original thickness of about 500 $\mu$m in 5 inch wafer can be reduced in thickness to, for example, 200 $\mu$m.

Figure 2:
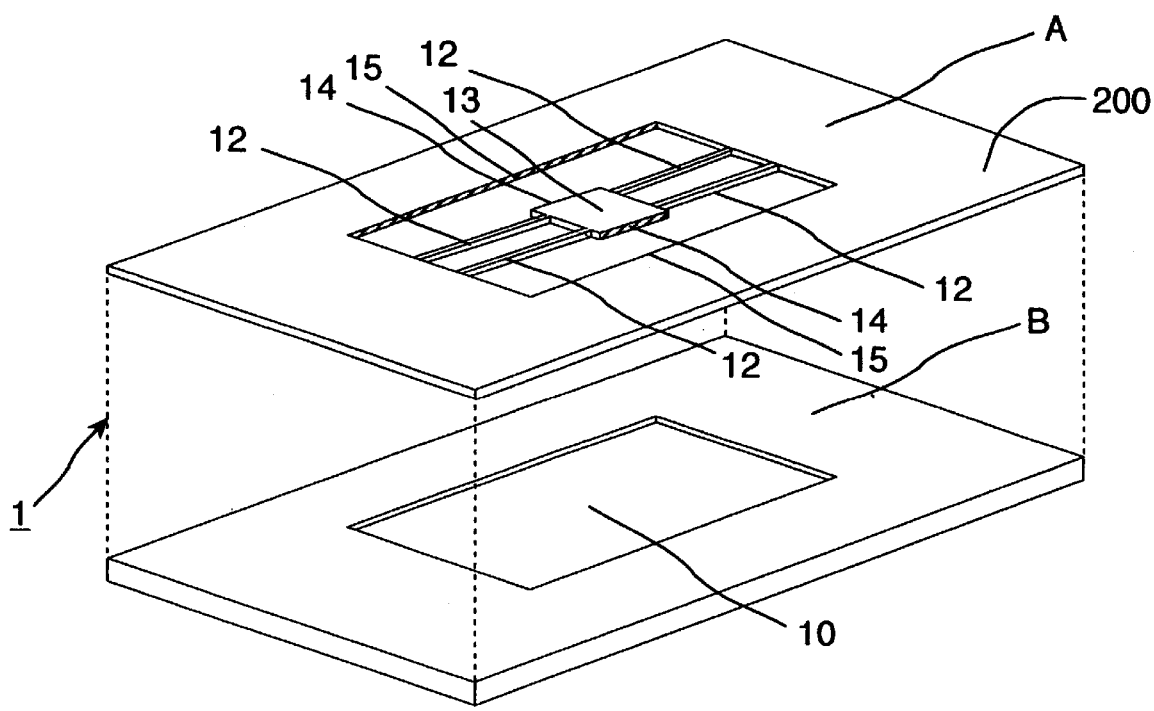
FIG. 2 is an exploded perspective view showing details of construction of the inertia sensor according to the embodiment shown in FIG. 1, the sensor being operable as an acceleration sensor.
Figure 2:
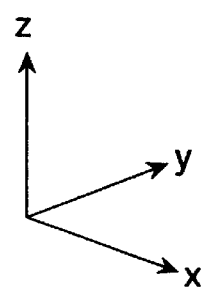

Referring to FIG. 2, details of construction of the FIG. 1 embodiment of the inertia sensor will be described. The sensor 1 is constructed of the sensing layer A which incorporates the single structure including electrodes and wiring lines and having the function of sensing by itself and the auxiliary layer B for structurally assisting the sensing layer, the two layers being affixed to each other in a laminar form. For example, a silicon wafer is used for the sensing layer A and a glass substrate (glass wafer) is used for the auxiliary layer B. In formation of the sensing layer A, electrode pads, wiring lines and a circuit section are worked on the silicon wafer and thereafter, the thus worked wafer is applied with suitable resist. The resist is then patterned in order that the wafer can be etched, leaving a mass body 13, a set of beams 12 for supporting the mass body, a portion necessary for bonding to glass and the circuit section behind, by using the device (not shown) capable of working the wafer at a high aspect ratio. Each of the mass body 13 and the beam set 12 for supporting it has the same thickness as that of the silicon wafer and in case a wafer of 5 to 6 inches for mass production is used, the thickness approximately amounts up to 400 to 600 $\mu$m. Finally, the opening (recess or through-hole) 10 is formed in the glass substrate through, for example, simple and inexpensive sandblast process and the silicon wafer and the glass substrate are bonded to each other by, for example, fusion-bonding (in the case of FIG. 2, the opening is a recess).

The embodiment of FIG. 2 shows an example of structure of a sensor capable of detecting acceleration in x-axis direction in the figure. The mass body 13 is resiliently supported by the set of linear beams 12 so as to be displaced in only the x-axis direction.

Each of the beams has a substantially rectangular cross-sectional form and by making the digging depth in the sensing layer A longer than the width of each beam, the beam is unapt to move in a direction vertical (along Z axis in the figure) to the surface and the displacement can be limited to in-plane displacement (xy direction) which is in the surface direction.

The acceleration sensor differs from the angular velocity sensor in that velocity $\underline{v}$ need not be applied to the mass body, that is, the mass body need not keep vibrating. When acceleration in the x-axis direction is applied to the sensor, a force corresponding to the product of the mass of mass body 13 and the applied acceleration is applied to the mass body 13, causing the mass body to displace along the x-axis.

Here, it is important for operation of the acceleration sensor that the mass body 13 has a meaningful volume (mass) necessary for measurement. By providing a thin electrical conductor pattern on the surface of the beam set 12 and the mass body 13, acceleration can be measured from a change in resistance of the electrical conductor due to deformation of the beam set. It is also of significance that work operations for the above purpose can all be effected from only the silicon wafer surface side.

The construction of the support beam set 12, mass body 13 and a frame structure 200 of the sensing layer is schematically illustrated in FIG. 2. An embodiment of detailed construction of the sensing layer will be described with reference to FIG. 3.

Figure 3:
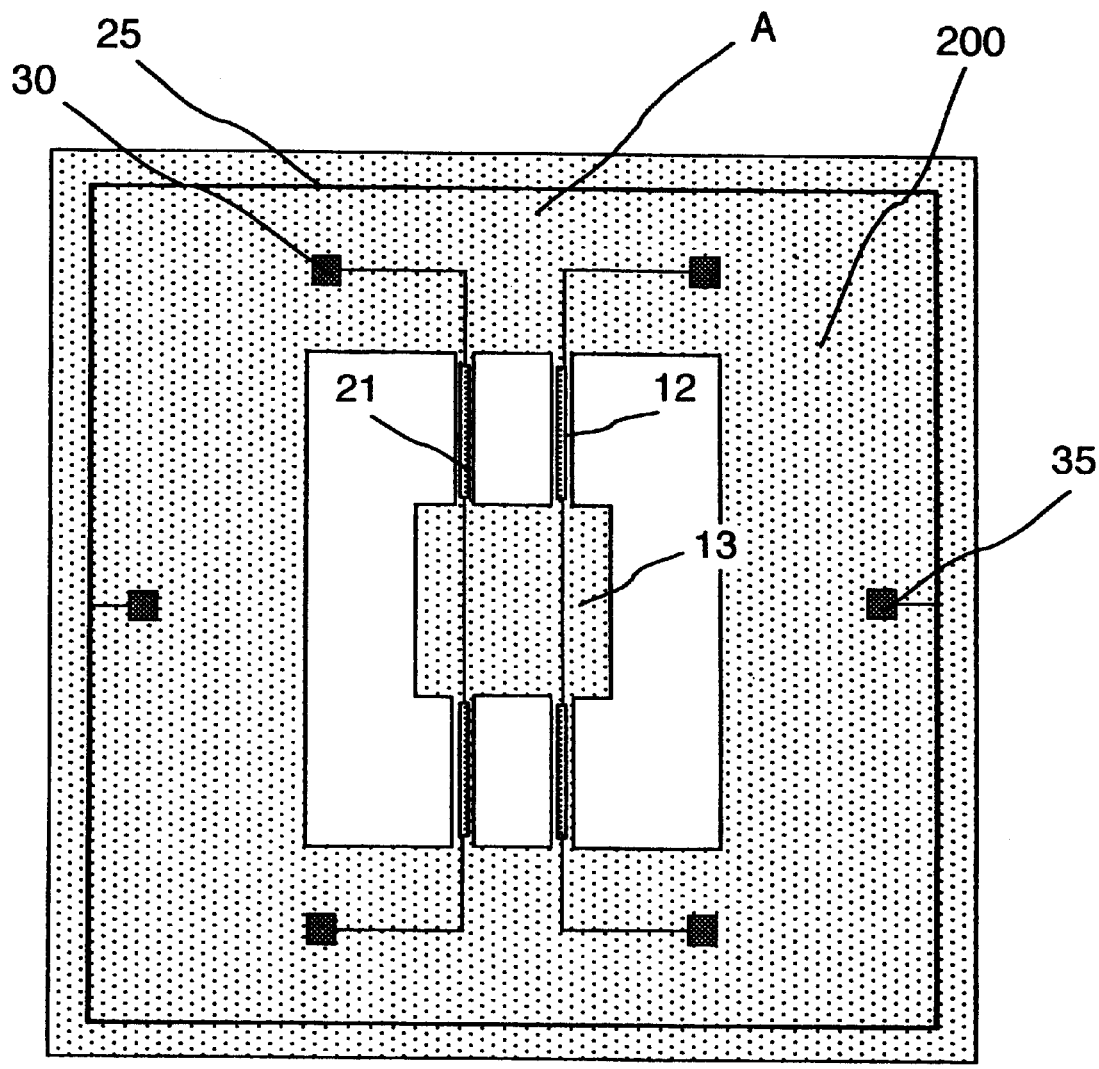
FIG. 3 is a plane view showing an embodiment of detailed construction of a sensing layer in the embodiment shown in FIG. 2.

The sensing layer A is viewed from above as illustrated in FIG. 3, showing a conductor section 21 for signal detection and leading pads 30 from the electrode section. In FIG. 3, the conductor section 21 is exaggerated for assuring a better view thereof. In the figure, a ground line 25 connected to electrode pads 35 is laid. When acceleration to be measured is applied in $\underline{x}$ direction in FIG. 3, the mass body 13 supported by the support beam set 12 is displaced in a direction opposite to the acceleration direction. At that time, the electrode section 21 connected to the support beam set 12 is deformed to cause its electrical resistance to change. In addition, by surrounding the electrical wiring lines for signal detection by the ground line 25, the influence of external electrical noise can be reduced.

A contrivance as below can be taken to efficiently obtain a larger sensor output. More particularly, a-permanent magnet, though not illustrated in FIG. 3, is also affixed to the bottom of the glass substrate so that a magnetic field generated by the permanent magnet may pass through the mass body 13 vertically thereof. At that time, with an electrical conductor laid on the mass body 13 in parallel to $\underline{y}$ axis, an induced voltage based on electromagnetic induction is generated both ends of the electrical conductor as the mass body 13 moves and a displacement velocity of the mass body 13 can be known from the induced voltage. By applying a signal process for time integration to the induced voltage, an amount of displacement of the mass body 13 in the x-axis direction can be known. Since a force necessary to displace the beams and the mass of the mass body are known in advance, the applied acceleration can be known from the thus obtained displacement amount. Of course, when the signal processing speed is sufficiently high, acceleration can be determined directly from a change in measured velocity. The detailed structure of sensing layer A is disclosed in FIG. 4.

Figure 4:
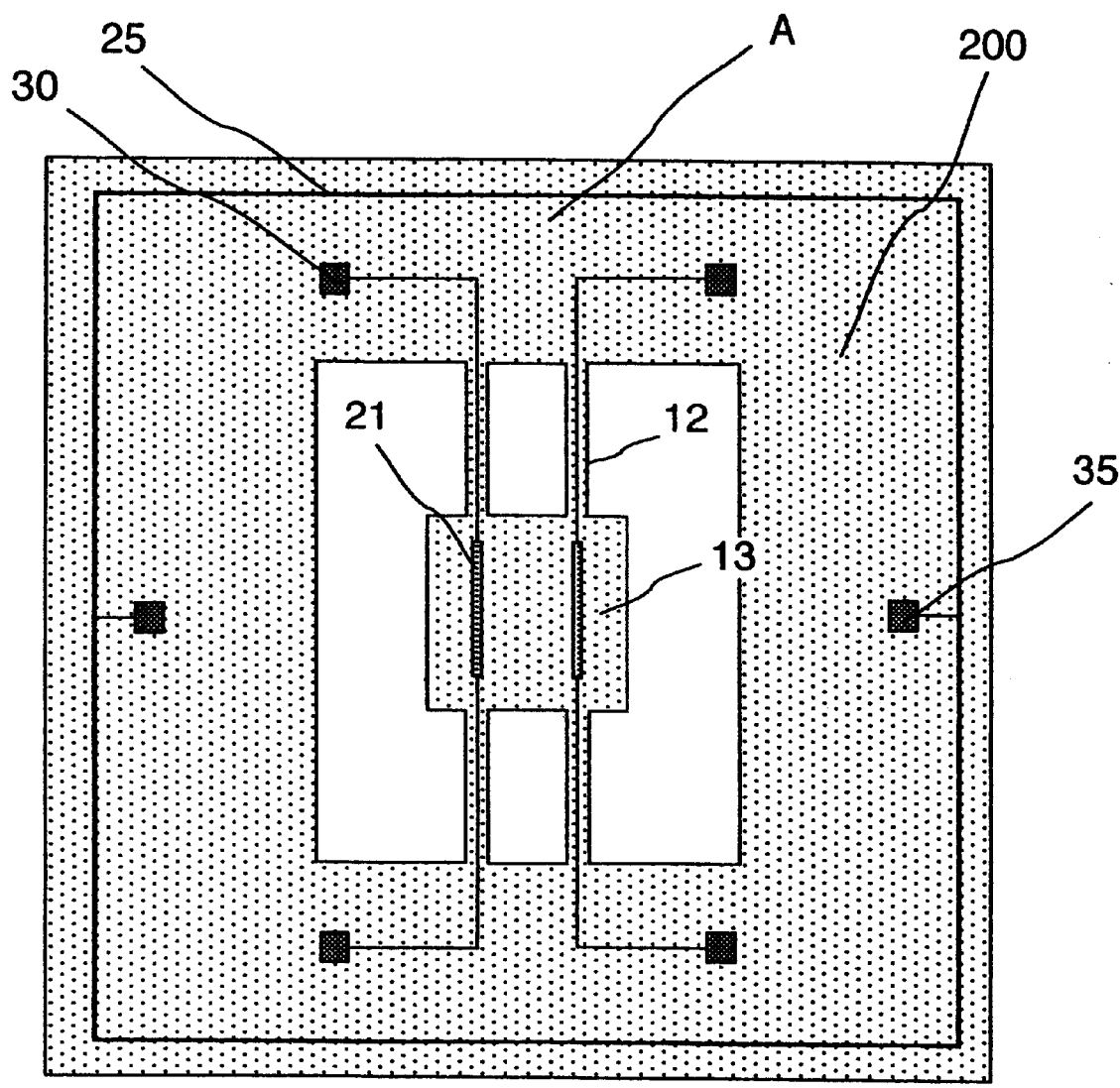
FIG. 4 is a plane view of another embodiment of detailed construction of the sensing layer.
Figure 4:
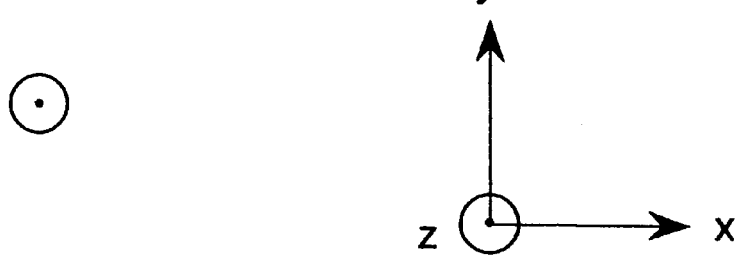

The embodiment shown in FIG. 4 presupposes that a magnetic field B is applied in a direction vertical to the sheet of drawing.

The FIG. 4 embodiment differs from the FIG. 3 embodiment in that a conductor section 21 for signal detection is provided on a mass body 13. Here the conductor section 21 is not deformed when a mass body 13 moves. When acceleration to be measured is applied in x-axis direction in the figure, the mass body 13 supported by a set of support beams 12 is displaced, together with the conductor section 21, in a direction opposite to the acceleration direction. Since the conductor section 21 comprised of electrical conductors moves in the magnetic field B, an electromotive force is induced across the conductor section 21. The electromotive force can be taken out electrically and detected through leading pads 30.

By providing a pair of electrodes for displacement detection on the side surface of the mass body 13 and on the inner surface of the sensing layer in place of the permanent magnet, a displacement of mass body 13 in the x-axis direction can be detected as a change in electrostatic capacitance between the paired electrodes.

Figure 5:
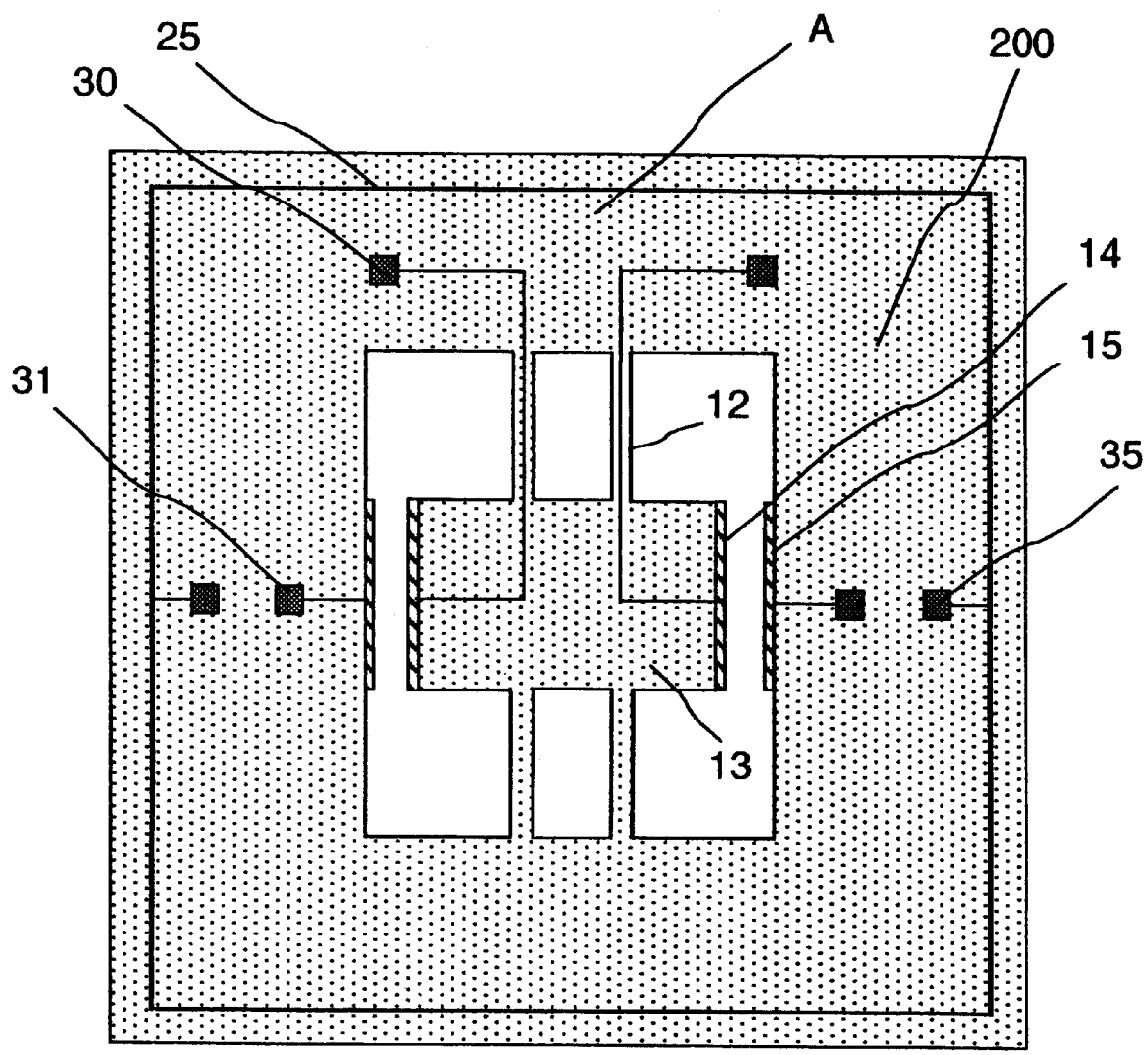
FIG. 5 is a plane view of still another embodiment of detailed construction of the sensing layer.

Referring to FIG. 5, this embodiment of detailed construction of the sensing layer will be described.

In the present embodiment, electrode sections 14 and 15 for signal detection (also shown in FIG. 2) are attached to the side surfaces of mass body 13 and frame structure 200, respectively. When acceleration to be measured is applied in x-axis direction in the figure, the mass body 13 supported by a set of support beams 12 is displaced in a direction opposite to the acceleration direction. At that time, the distance between the electrodes of the electrode sections 14 and 15 is changed to change the electrostatic capacitance between the two electrodes. The applied acceleration can be detected from a change in electrostatic capacitance. It is desirable for efficient acquisition of the change in electrostatic capacitance that the distance between the electrodes of the electrode sections 14 and 15 is narrow. In the figure, the electrode distance can be adjusted by adjusting the transverse length of the mass body 13. An increase in electrostatic capacitance associated with a long wiring line prevents accurate detection of capacitance and therefore, the wiring line is desired to be as short as possible.

As described above embodiments in FIGS. 3, 4 and 5, the mass body 13 constituting the sensing layer is displaced in a direction parallel to a junction or bonding surface between the sensing layer and the auxiliary layer and it is not required that the structure of wiring lines and electrodes be provided on the auxiliary layer. Therefore, all components necessary for sensing, inclusive of the electrodes and wiring lines, can be provided on the sensing layer in FIGS. 3 and 4, especially, on its surface. Through this, a sensor device in which the sensing portion is integral with the associated detection circuit and signal processing circuit can be realized easily.

In the embodiment of FIG. 4 in which the permanent magnet is provided at the bottom of the auxiliary layer B, the silicon layer is required to be worked at only its surface and the magnetic effect fulfils itself through the auxiliary layer B in a contactless manner, thereby making it possible to increase the output signal without impairing the simplicity of the sensor structure. When a rare-earth cobalt magnet is used as the permanent magnet, a sufficient magnetic field can be generated even if the magnet has a size of several of millimeter cubic or less. In place of the permanent magnet, a small-sized coil capable of generating an equivalent magnetic field can be provided. From the standpoint of integration of the peripheral circuit, the provision of the sensor function in the frame 200 having its surface flush with the surface of the sensor without any gap is of importance. Since the frame 200 and the sensing portion are of the same material, for example, silicon, integration of the circuit section on the surface of the frame can be accomplished through the semiconductor fabrication process. In particular, by virtue of both the surfaces being flush with each other, aerial wiring and stereoscopic wiring such as wire bonding can be dispensed with, contributing to effective integration.

In this case, electrode pad 30 disclosed in FIGS. 3, 4 and 5 can be omitted, and wiring pattern can be directly extended to signal processor fabricated on the frame 200. Therefore, electrode pads are to be provided at input/output portion of the signal processor.

Figure 6:
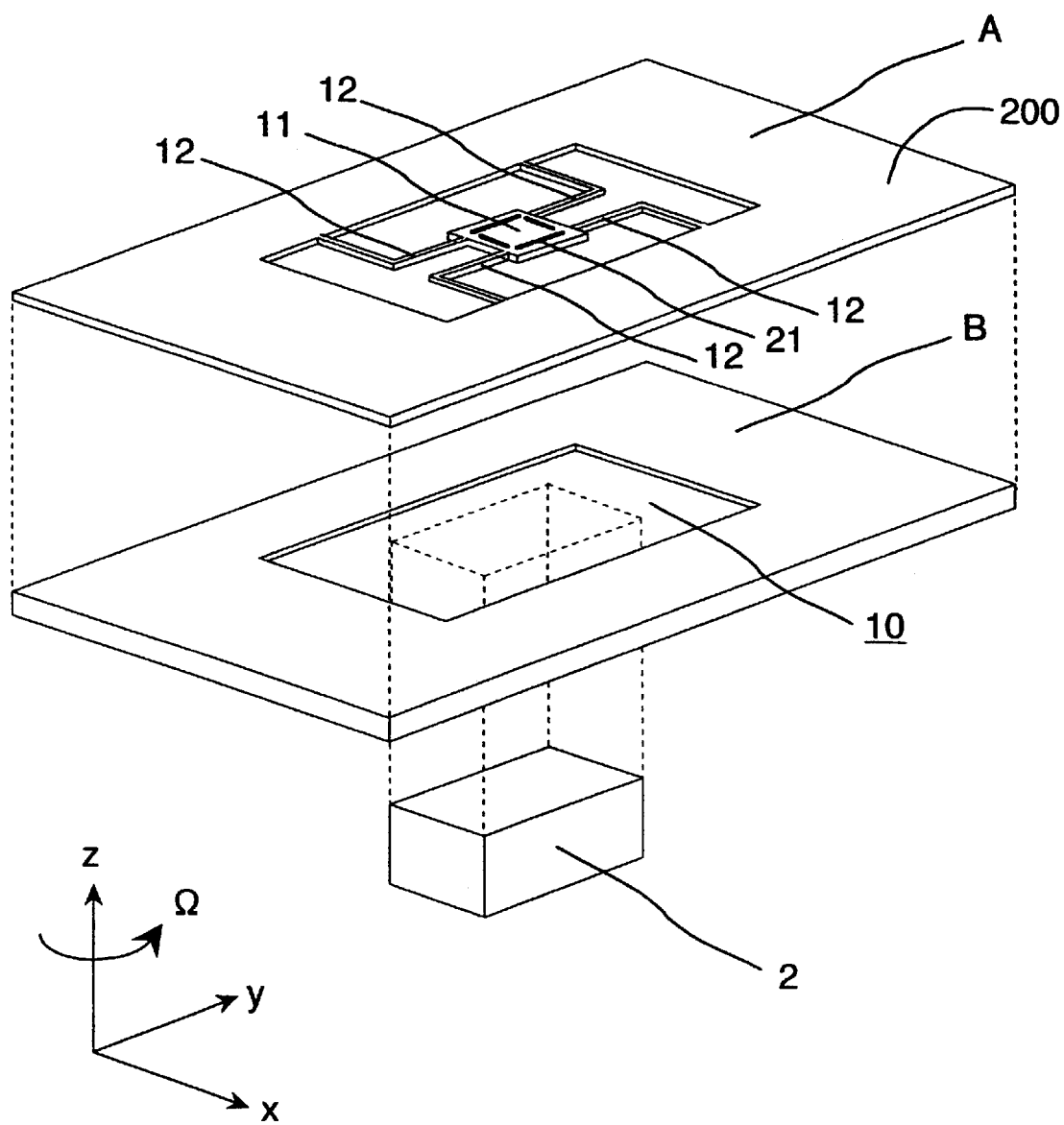
FIG. 6 is an exploded perspective view of another detailed structure of the inertia sensor as shown in FIG. 5, the sensor being operable as a rotational angular velocity sensor.

Referring to FIG. 6, another embodiment of the inertia sensor according to the invention will be described. In the present embodiment, an example of construction of a semiconductor sensor will be described which can detect rotational angular velocity Ω about a direction vertical to the junction surface between sensing layer A and auxiliary layer B, that is, about z axis in the figure. For example, a silicon wafer is used for the sensing layer A and a glass substrate (glass wafer) is used for the auxiliary layer B. An outline of fabrication method is similar to that described in connection with the FIG. 2 embodiment. A vibratory body 11 is resiliently supported by a set of L-shaped beams 12 so as to be displaced in only x-axis and y-axis directions. Vibratory movement in the x-axis direction can be realized with beam portions parallel to the y axis and vibratory movement in the y-axis direction can be realized with beam portions parallel to the x axis.

In order to limit the vibratory movement to in-plane movement, a structure in which each beam has a rectangular cross-sectional form having its major side in the vertical direction may be used as described previously.

A conductor section 21 is formed on the vibratory body 11 through the semiconductor wiring production process. Electrode sections 31 to 32 and wiring lines are formed on the sensing layer A as will be detailed with reference to FIG. 7. A permanent magnet 2 is affixed to the bottom of the glass substrate to permit a magnetic field to be generated in z-axis direction. A recess or through-hole 10 is formed in the glass substrate (recess is shown in FIG. 6). For example, in the case of formation of a through-hole, the size of the permanent magnet 2 can be larger than that of the through-hole to facilitate packaging.

An example of a method of drive and detection to be effected actually with the inertia sensor of FIG. 6 will be described with reference to FIG. 7.

Alternating voltage is applied across at least one of two sets of the electrode pads 31 and 32 which are provided on the right or left side to pass alternating current through a wiring line 23 formed on the beam set 12 and a portion of conductor section 21 formed on the vibratory body 11 in parallel to the y axis, the wiring line 23 and conductor section 21 being formed by using the semiconductor wiring production process, so that Lorentz force is generated which drives the vibratory body 11 in the x-axis direction. In this case, if current is not passed through, for example, the right-hand electrodes of the electrode sections 31 and 32, then an voltage will be induced across a right-hand portion of the conductor section 21 owing to electromagnetic induction as this conductor portion vibrates in the x-axis direction. The induced voltage can be taken out so as to be monitored.

Since the vibration amplitude of the vibratory body 11 can be known from the induced voltage, the vibration amplitude of the vibratory body 11 in the x-axis direction can be made to be constant by feedback-controlling the alternating voltage across the left side electrodes of the electrode sections 31 and 32 such that the vibration amplitude becomes constant.

The vibratory body 11 is supported by the L-shaped beam set 12 as described in connection with FIG. 6. Practically, each L-shaped beam consists of a linear beam portion, also designated by reference numeral 12, and another beam portion 101. These beam portions 12 and 101 are connected to each other through an intervener 100. The intervener 100 is used to ensure that vibrations in the x-axis and y-axis directions in the figure can hardly mix with each other. This expedient is important for making the sensor serve as angular velocity sensor to be described later. The support method as above needs a relatively large area. But, in the inertia sensor according to the invention, formation of the recess making room for freely moving the vibratory body is not accomplished by anisotropic etching of the silicon wafer but is done by sandblasting the auxiliary layer, for example, glass substrate and therefore the larger area can be formed with ease. In addition, the unwanted area can be reduced as described previously, and cost will be decreased.

From the view point of productability, since etching process of the rear side of silicon which takes long time is omitted, the producing efficiency is improved.

When angular velocity Ω about z axis is applied to the vibratory body 11 while the vibratory body 11 is driven in the x-axis direction, Colioris' force Fc given by equation (1) acts on the vibratory body 11 in the y-axis direction, causing the vibratory body 11 to vibrate slightly in the y-axis direction. In equation (1), m is mass of the vibratory body 11 and v is velocity of the vibratory body 11 driven in the x-axis direction. The volume of the beam set is assumed to be sufficiently smaller than that of the vibratory body.

A vibration of the vibratory body 11 due to the Colioris' force can be detected by measuring a terminal voltage across a conductor section 22 formed on the vibratory body 11 in parallel with the x axis, that is, a voltage induced across electrodes of the electrode sections 33 and 34 owing to electromagnetic induction and therefore, magnitude Ω of the applied angular velocity can be known from the vibration amplitude. In the FIG. 7 example, the aforementioned electrode sections 31 to 34, the conductor sections 21 and 22 on the vibratory body 11 and wiring lines 23 and 24 on the beam set 12 are insulated from the silicon wafer by a silicon oxide film but for the remaining electrode section 35 and, the oxide silicon film is etched to permit them to come in contact with the silicon wafer, so that these electrode section 35 and wiring line 25 can act as ground electrode section and wiring line provided for grounding the silicon wafer per se.

In FIG. 6, structures of beam set 12, vibratory body 11 and frame structure of the sensing layer 200 are generally explained.

The details of the sensing layer is described in the following.

Figure 7:
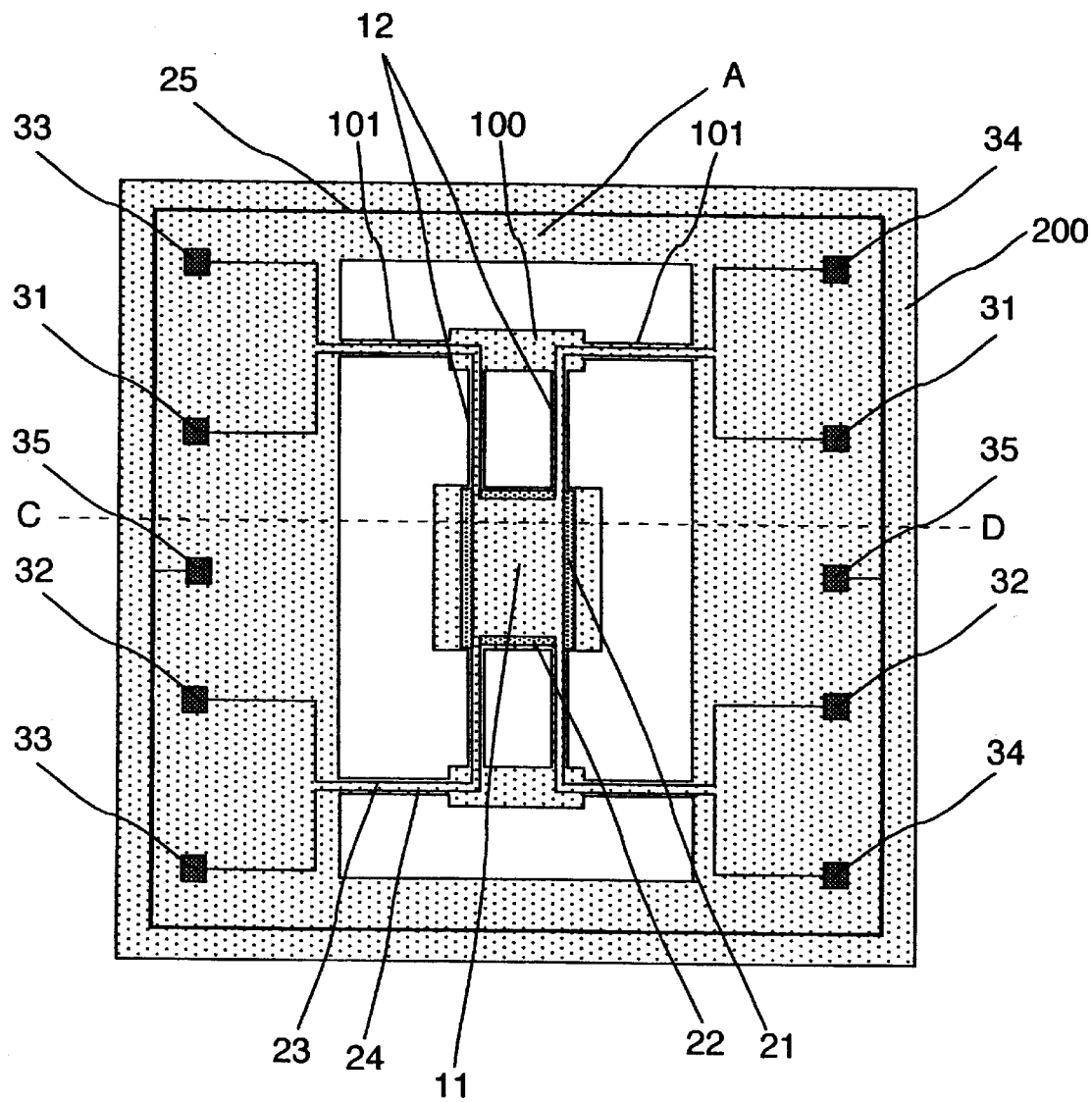
FIG. 7 is a plane view showing structural details of the angular velocity sensor.
Figure 7:
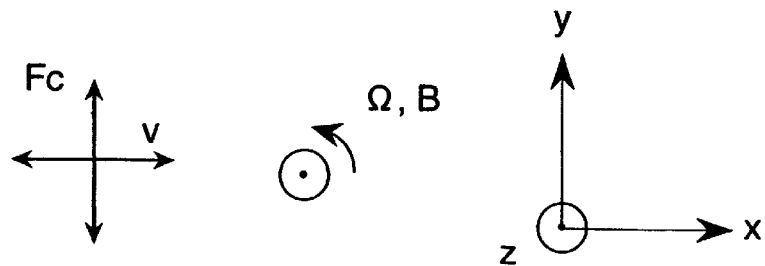

In the example of FIG. 7, it is presupposed that the magnetic field B is applied in the direction vertical to the sheet of drawing as explained in one example of drive detection method. The sensing layer is viewed from above to show the conductor portion 21 for drive of the vibratory body, the conductor portion 22 for signal detection, the wiring lines 23 serving a the leading lines of the drive conductor portions 21, the wiring lines 24 serving as the leading lines of the detection conductor portions 22, the electrode pads 31 and 32 connected to each leading line 24, and the electrode pads 33 and 34 connected to each leading line 24. Denoted by 200 is the frame structure of the sensing layer A. Each L-shaped beam of the beam set 12 for supporting the vibratory body 11 has beam portions 12 and 101 which are connected to each other by the intervener 100. By providing the L-shaped support beam set 12 as shown in FIG. 6 with intervention of the intervener 100 as shown in FIG. 7, a vibration in the x-axis direction can be separated distinctively from a vibration in the y-axis direction. Since the two vibrations which are mutually orthogonal on the plane can be separated distinctively from each other, detection of angular velocity can be realized effectively with the sensor structure which vibrates on the plane only. Also, the ground wiring line 25 and electrode section 35 connected thereto are laid to surround the electrical wiring for signal detection, thereby reducing the influence of external electrical noise as in the case of the embodiment of acceleration sensor.

Figure 8:
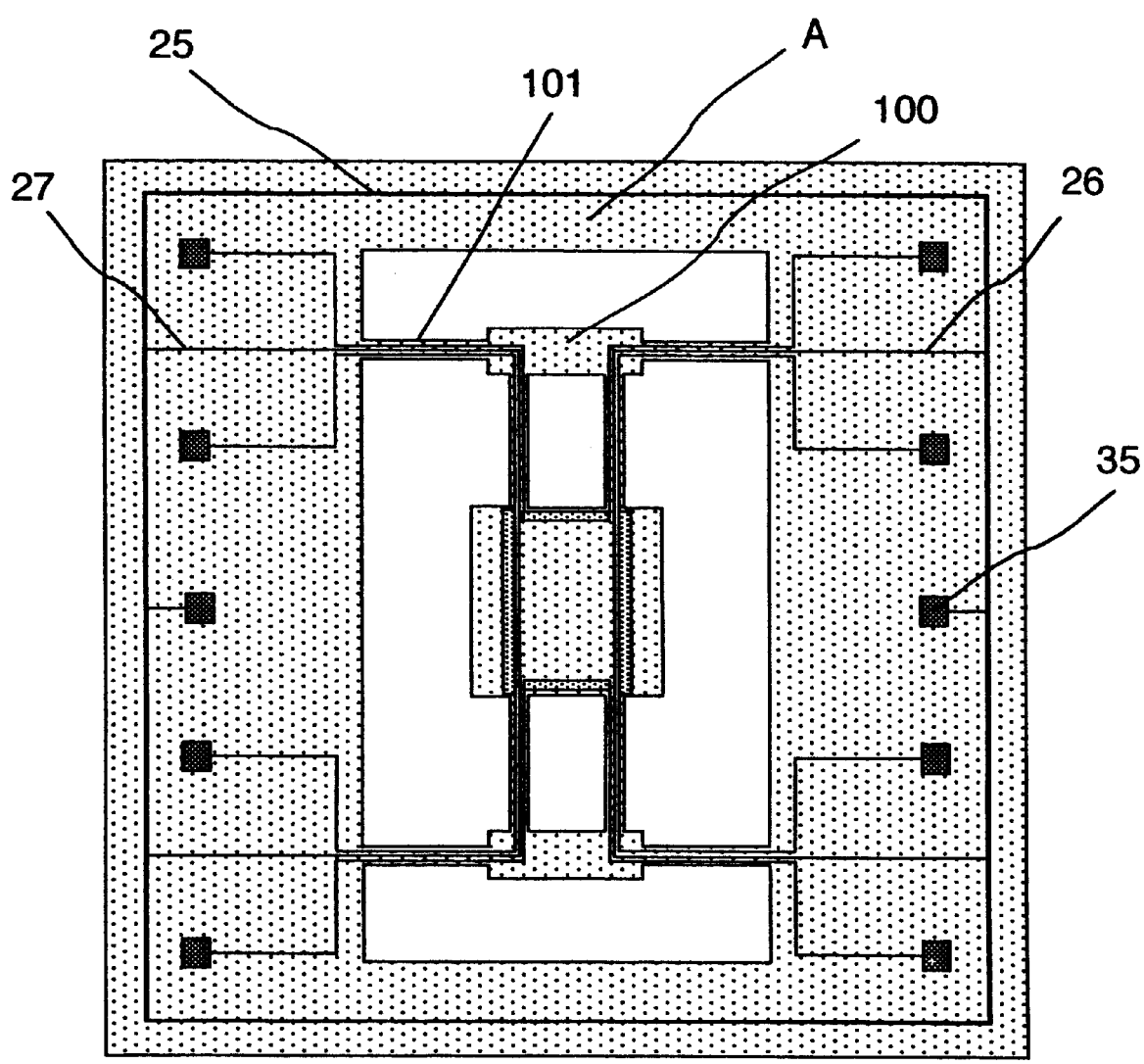
FIG. 8 is a plan view showing a modified embodiment of angular velocity sensor, the modification having a ground wiring line laid between signal lines.

Referring to FIG. 8, a modified embodiment of the embodiment shown in FIGS. 6 and 7 will be described. In this modification, a ground line 26 or 27 is provided between the signal lines. When ground lines are provided as shown in FIG. 8, a sensor can hardly be affected by a change in electrical potential surrounding the sensor and signal detection of high SIN ratio can be permitted. The drive wiring line and the detection wiring line extend on a thin beam. However, interference of signals of the two lines may matters in some cases.

As described above, in the present modification, in addition to the members of the FIG. 7 embodiment, each of the ground lines 26 and 27 is laid between the signal wiring lines, thereby making steady the electrical separation between the wiring lines of electrode sections laid closely on the beam.

For example, the wiring lines can be worked finely with ease through the semiconductor fabrication process so that they may have a width of about 2 μm and may be spaced apart by a distance of about 2 μm.

Figure 9:
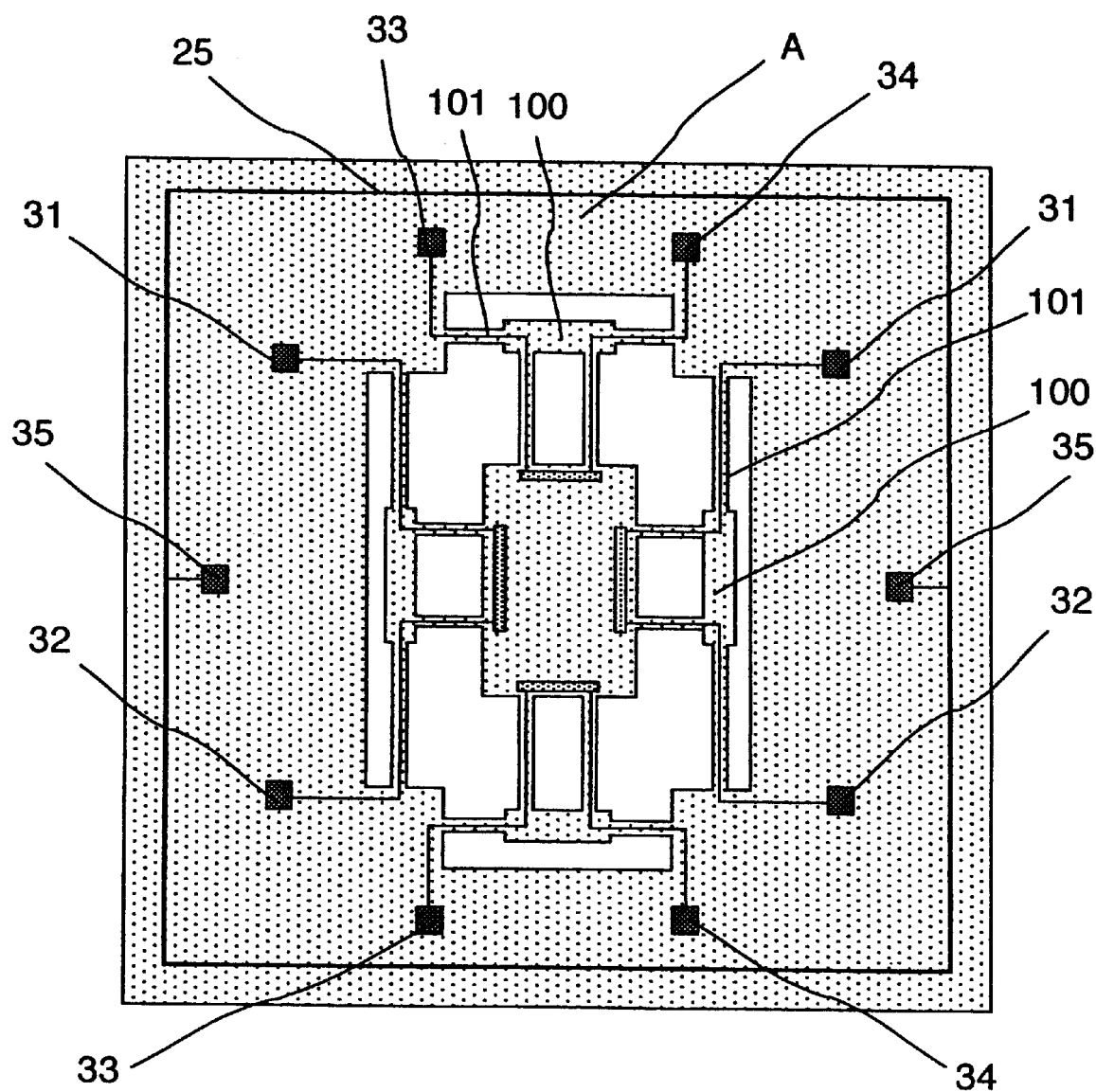
FIG. 9 is a plane view showing still another embodiment of the angular velocity sensor in which wiring lines are separated.
Figure 9:
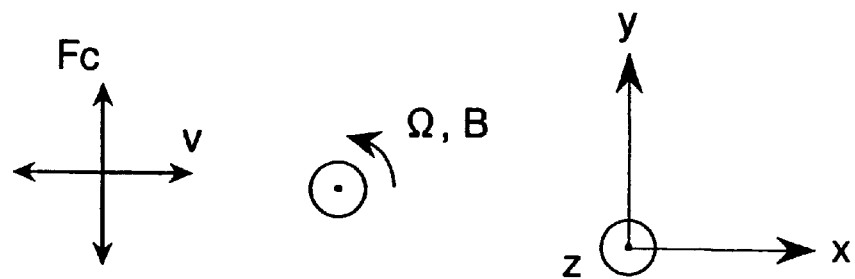

Turning to FIG. 9, still another embodiment of the semiconductor sensor is illustrated in which instead of providing the ground wiring line between the signal wiring lines as in the case of FIG. 8 embodiment, different signal wiring lines are laid on separate beam parts.

By this structure cross-talk between signal lines is decreased.

Each beam part, in the example of FIG. 9, has an L-shaped beam, two portions of which are connected to each other through an intervener 100 to distinctively separate vibrations in x-axis and y-axis directions from each other. Of course, the intervener 100 may be omitted to enable only an integral L-shaped beam part to support the vibratory body.

In the FIGS. 2, 5 embodiments, when instead of the use of the permanent magnet, a pair of electrodes (not shown) for vibratory body drive and a pair of electrodes (not shown) for displacement detection are provided such that one electrode is laid on the side surface of the vibratory body 11 and the other electrode is laid on the inner side surface of the silicon wafer A as explained in connection with the FIG. 5 embodiment, the vibratory body 11 can be driven in the x-axis direction by electrostatic force through the use of the electrode pair in the x-axis direction and displacement of the vibratory body 11 due to Colioris, force can be detected by the pair of electrodes provided in the y-axis direction.

Electrode might be structured as meshed with each other as the teeth of a comb.

In the angular velocity sensor using the permanent magnet, a slight displacement of vibratory body 11 due to Colioris' force is detected by measuring a generated voltage and advantageously, the signal detection circuit can therefore be more simplified than in the sensor based on electrostatic capacitance measurement.

With the angular velocity sensor constructed as above, directions of vibration and displacement detection of the vibratory body 11 can both be confined within a plane (or in plane) parallel to the junction plane between the sensing layer and the auxiliary layer and it is not required to form the structure of wiring lines and electrodes on the auxiliary layer, thus ensuring that all components necessary for sensing, inclusive of the electrodes and wiring lines, can be provided on the sensing layer. This advantage is the same as in that described in connection with the first embodiment of the invention. Further, the effects also described previously and brought about by dispensing with work of the bottom of the silicon wafer and forming the recess or through-hole in the glass substrate-can also be attained.

Further, by providing the sensor portion in the frame 200 having its surface flush with the surface of the sensor portion, integration with the periphery circuit can also be facilitated as described previously. In contrast to the foregoing embodiments having the electrode pads, the integration with the periphery circuit can be achieved without resort to the electrode pads by extending the wiring pattern as it is to the periphery circuit. Since the sensor portion has its surface flush with the surface of the frame, wiring lines can be laid through the semiconductor fabrication process.

Referring now to FIGS. 10 to 16, an example of fabrication process of the angular velocity sensor according to the FIG. 6 embodiment will be described by way of a cross section on line C–D in FIG. 7.

Figure 10:
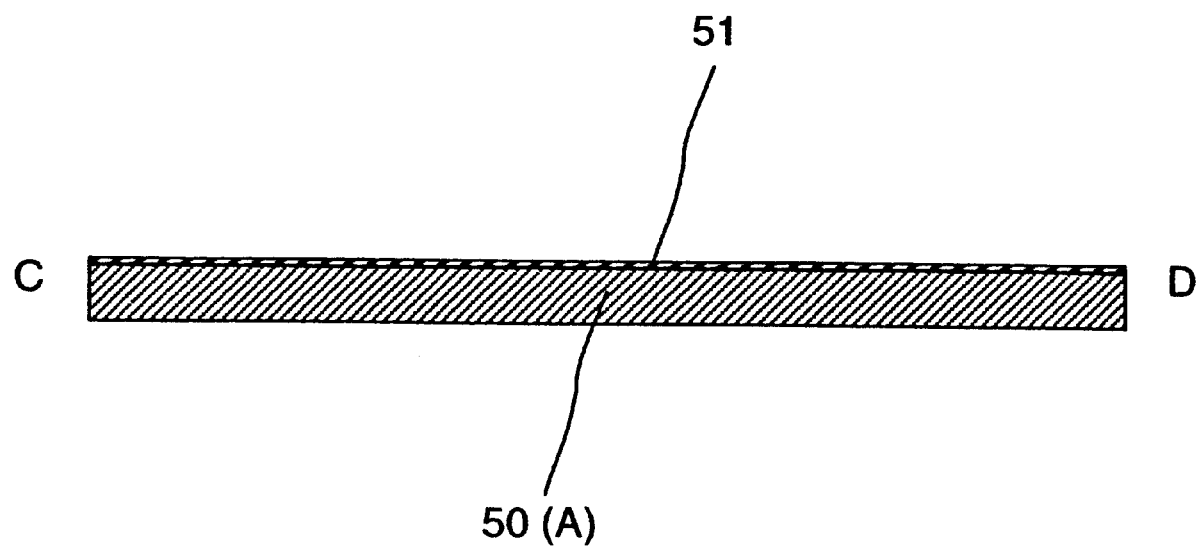
FIGS. 10 to 16 are sectional views for explaining an example of steps in a process for fabrication of the FIG. 7 angular velocity sensor.
Figure 10:
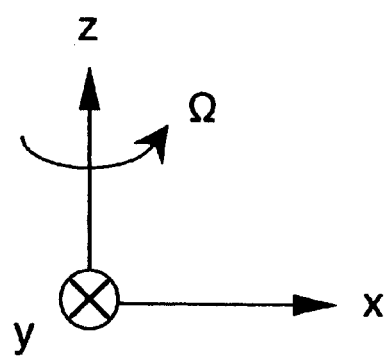

Firstly, in a step shown in FIG. 10, an insulating thin film of, for example, silicon oxide or silicon nitride is formed as insulating film 51 on the surface of a silicon wafer 50 of single crystalline silicon through insulating film formation process.

Figure 11:
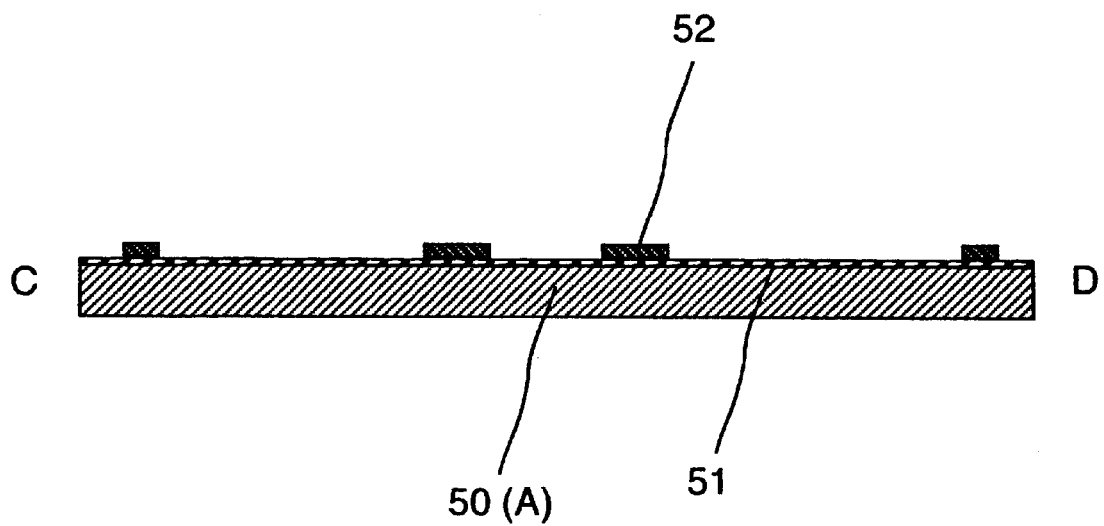

After forming a contact hole (not shown) for contact to the silicon wafer 50, including necessary conductivity such as by diffusion of boron, by etching the insulating film 51, a film 52 of, for example, aluminum is formed through vapor deposition or sputtering process and the thus formed film 52 is patterned by dry etching to provide wiring lines and electrodes in a step of FIG. 11.

Figure 12:
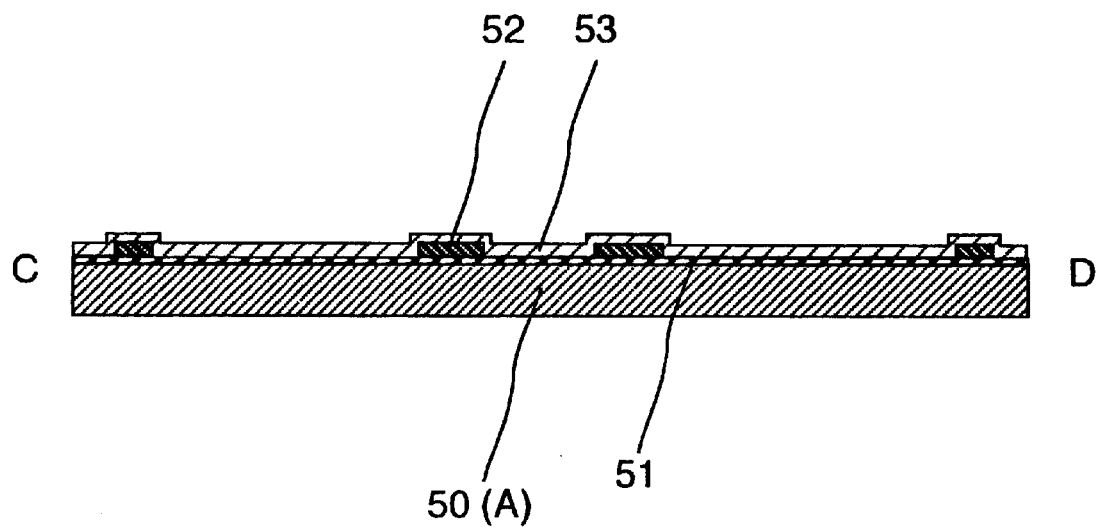

In a step shown in FIG. 12, for the purpose of preventing leakage current between fine wiring patterns on the beam 12, a passivation film 53 of, for example, silicon nitride is formed.

Subsequently, in a step shown in FIG. 13, in order to permit the silicon wafer to be through-etched at an area other than a part necessary for formation of the vibratory body 11, beam set 12 for supporting the vibratory body, bonding to glass, and circuit section (frame 200), the silicon nitride film 53 and silicon oxide film 51 deposited at the area to be through-etched are removed.

In a subsequent step, the wafer will be dug vertically at the area removed of the silicon nitride film.

That is, silicon nitride and silicon oxide film works as a mask for deep etching.

Figure 13:
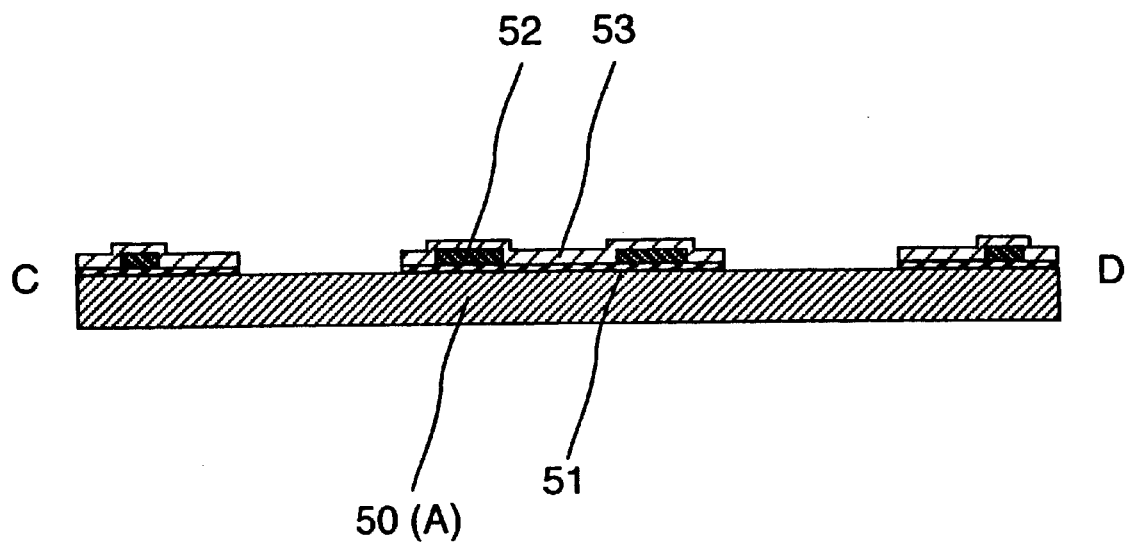
Figure 14:
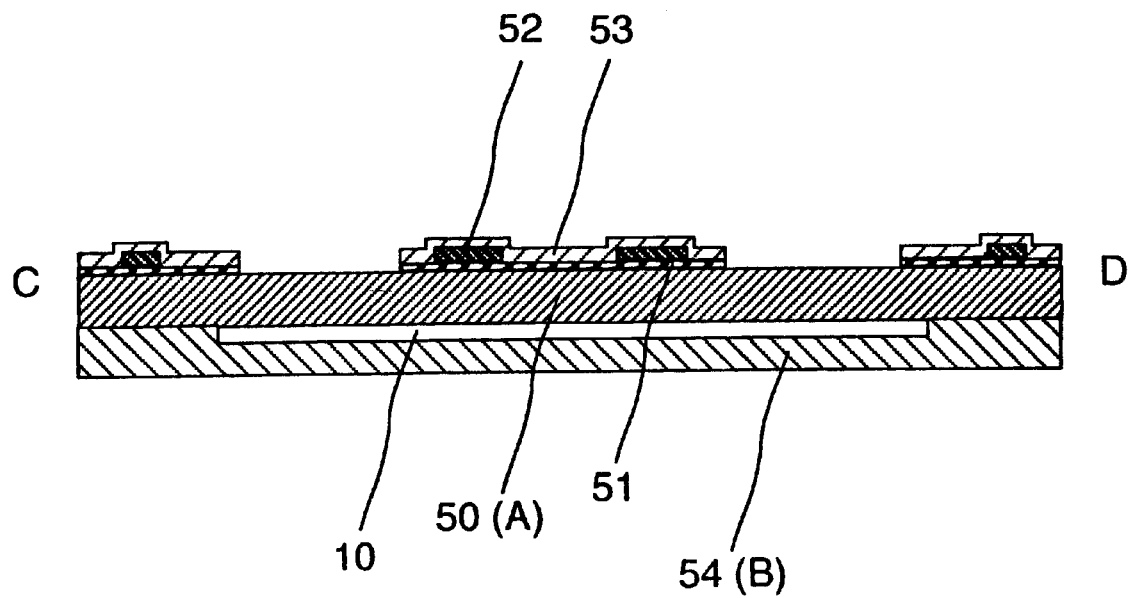

In a step shown in FIG. 14, a glass substrate 54 formed with a recess or through-hole 10 by using, for example, sandblasting is affixed or bonded to the resulting silicon wafer obtained through the steps ending in FIG. 13 by using, for example, fusion bonding process. For fusion bonding, low melting point glass may preferably be used for the glass substrate 54. If Pyrex glass is used for the glass substrate 54, the glass substrate may be bonded to the silicon wafer by anodic bonding.

The silicon wafer and the glass substrate can be affixed to each other steadily by using any of the boding methods. The recess 10 is now hermetically sealed by silicon and glass. Gas such as air confined in the interlaid space changes its volume depending on temperatures and to avoid the adverse influence due to the volume change, a groove connecting the recess 10 to the outside atmosphere is formed in the upper surface of glass substrate. In this manner, gas prevailing inside the recess can escape to the atmosphere.

Figure 15:
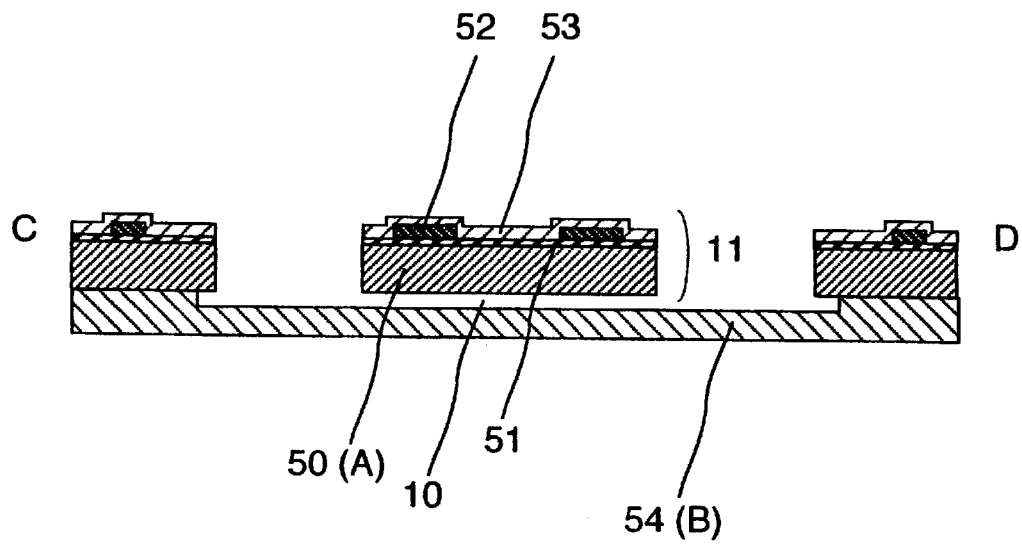

In a step shown in FIG. 15, part of the silicon wafer 50, where the silicon nitride film 53 and the silicon oxide film 51 is removed in the step shown in FIG. 13 is through-etched by using a technique, for example, ICPRIE (induction coupling plasma reactive ion etching) to integrally form a vibratory body 11 and beam set 12 for supporting the vibratory body.

Typically, the wafer is worked from its surface by through-etching while being cooled from its bottom and the glass substrate is effective to prevent reactive ions from migrating to the cooling side after the wafer is through-etched or it is prevented gas for cooling to come out to surface silicon side. With the groove connecting the recess 10 to the atmosphere and openings for outside provided outer side of the glass substrate are formed, the wafer as it is can be subjected to ion etching.

Figure 18:
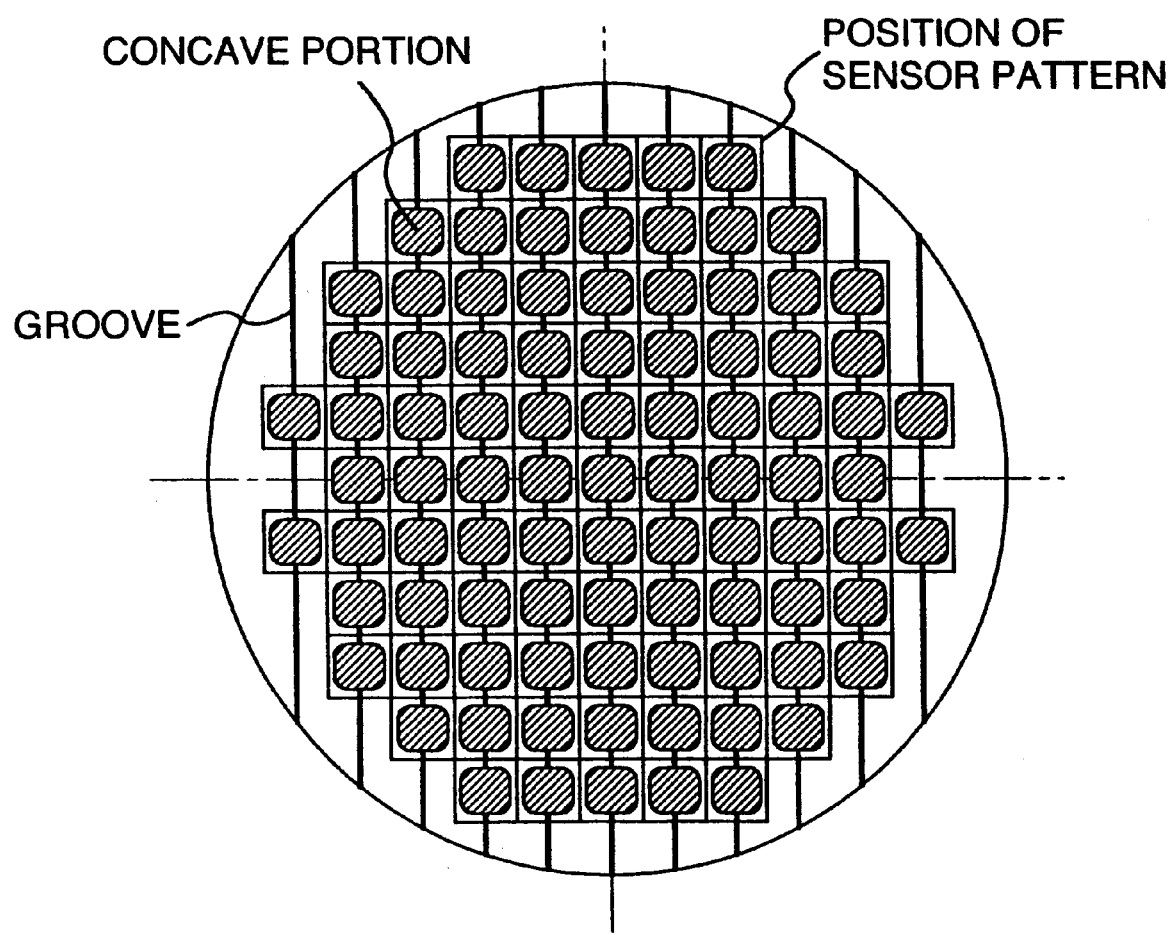
FIG. 18 is a diagram for explaining an example of a surface work pattern in which grooves and recesses are formed in a glass wafer according to teachings of the present invention, the grooves and recesses include opening connecting through externally at the outer periphery of the glass wafer.

Turning now to FIG. 18, there is illustrated an example of a surface work pattern when a glass wafer is used for the glass substrate. Practically, recesses formed through sandblast process are seen like smoked glass. A plurality of grooves passing through the recesses are formed in the glass surface, so that a plurality of recesses can concurrently communicate with the atmosphere through the grooves. Since groove is formed on the surface of the glass substrate, the opening to outside is naturally provided at the outer side of the glass substrate. In an instance of FIG. 18, sensors formed by working silicon are respectively placed in line with individual cells of sensor patterns each indicated by square block. When a glass wafer having the same size as the silicon wafer is used, mis-register hardly takes place when the both wafers overlap with each other. When the pattern on the glass wafer is made to coincide with orientation-flat of the silicon wafer, the difference in angle can be reduced.

The ICPRIE device can carry out work at an aspect ratio of about 15 to 20 and hence, even when a wafer having a thickness of about 500 μm is used, the width of each beam 12 can be reduced sufficiently and a support beam set having a relatively small spring constant can be formed. The portion not subject to through-etching is protected by the silicon nitride film 53 deposited in the previous step but depending on the ratio between thicknesses of the silicon wafer 50 and silicon nitride film 53, there is a possibility that the silicon nitride film 53 playing the role of protective film extinguishes in the course of etching. In expectation of such an event, a suitable resist film, for example, may further be coated on the silicon nitride film.

Figure 16:
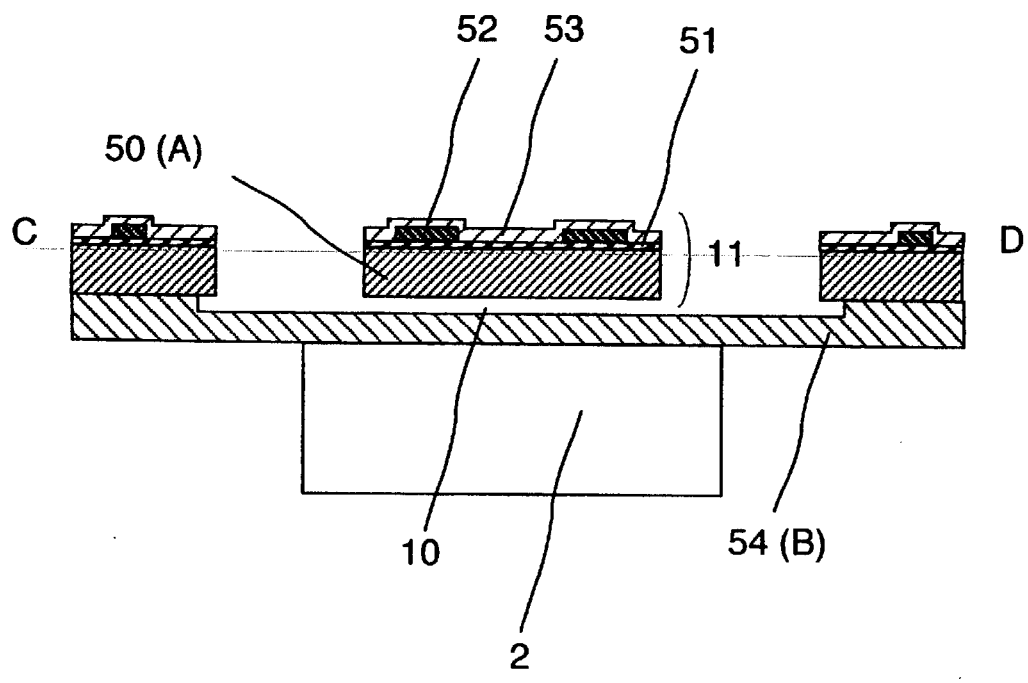

Finally, in a step shown in FIG. 16, a permanent magnet 2 is affixed to the bottom of the glass substrate 54 by using, for example, silicon bonding agent or epoxy bonding agent to form magnetic field generating means (drive source).

In this manner, an inertia sensor constructed as shown in FIG. 6 can be obtained.

The fabrication method for the embodiments of the inertia sensor of the invention is not limited to the use of the previously-described semiconductor fabrication process and obviously, the sensor may be fabricated by using another fine work technique.

In a vehicle control system using the embodiment of the inertia sensor according to the invention, rotational angular velocity about an axis vertical to the ground can be detected with the sensor packaged horizontally. Further, acceleration in a plane parallel to the ground can be detected. Especially, in automobiles, large restriction is imposed on space capable of packaging the sensor and packaging method but through the use of the inertia sensor according to the invention, simplified and steady packaging can be effected with ease and high sensitivity can be assured. Accordingly, by using the sensor, a vehicle control system which can effectively perform vehicle body control and rotation correction control in a radar system using laser or millimetric wave can be constructed.

According to the embodiments of the invention, in the inertia sensor having the sensing layer and the auxiliary layer affixed thereto through a surface junction, a movable member displaceable in a direction parallel to the junction surface is provided to the sensing layer and the opening in line with the movable member is formed in the auxiliary layer, thereby ensuring that sensitivity of the sensor can be improved as the mass of the movable member representing a constituent component of the sensing layer increases. Further, as compared to the sensor in which the opening is formed in the sensing layer, the possible danger of adversely affecting the sensing layer surface by contaminating and damaging it can be reduced and a highly reliable and inexpensive inertia sensor of high mass production adaptability can be provided.

Since in the sensor the movable member is displaced in a direction parallel to the junction surface between the sensing layer and the auxiliary layer, it is not required to form the structure of wiring lines and electrodes on the auxiliary layer and all components necessary for sensing inclusive of the electrodes and wiring lines can be provided to the sensing layer, especially, on its surface. Through this, the sensing portion can be formed integrally with its detection circuit and signal processing circuit to realize a highly reliable sensor device of simplified construction and high mass production adaptability.

As described above, according to the embodiments of sensor of the invention, a small-sized and highly precise sensor suitable for mass production can be provided which can have compatibility with a bulk type micromachine sensor of high sensitivity and a surface type micromachine sensor concentrating the main function of the sensor to the sensor surface. Especially from the standpoint of an application to a sensor carried on a vehicle having a limited sensor packaging space, the sensor of the invention capable of being packaged horizontally can find its application to an acceleration sensor or an angular velocity sensor having less irregularities in sensitivity and capability of steady packaging.

What is claimed is:

1. An inertia sensor comprising:
    a sensing layer including a detector; and
    an auxiliary layer fixed to said sensing layer through a junction surface,
    wherein said sensing layer has a movable member and at least one detection electrode for detecting a displacement of said movable member;
    said auxiliary layer has an opening formed therein at a position confronting said movable member; and
    said movable member is displaceable in only a direction substantially parallel to the junction surface between said sensing layer and said auxiliary layer wherein said sensing layer further has at least one drive electrode for driving said movable member.

2. An inertia sensor according to claim 1, wherein a drive and detection source is configured to at least one of detect motion of said movable member in a contactless fashion and drive said movable member in a contactless fashion through said auxiliary layer and is provided on the side of said auxiliary layer which is opposite to said junction surface.

3. An inertia sensor according to claim 2, wherein said drive source is a permanent magnet or magnetic field generating means for generating a magnetic field in a direction substantially vertical to said junction surface.

4. An inertia sensor according to claim 3, wherein said at least one detection electrode is provided linearly on the surface of a vibratory body constituting said movable member, a wiring pattern for said at least one linear detection electrode is provided on the surface of a support beam, said support beam also constituting said movable member, an induced electromotive force generated when said at least one linear detection electrode moves in a magnetic field generated by one of a permanent magnet and a magnetic field generator representing said detection drive source is detected, and in-plane acceleration of said vibratory body in a direction orthogonal to the longitudinal direction of said linear detection electrode is detected by sensing an amount of movement of said vibratory body.

5. An inertia sensor according to claim 3, wherein at least one set of said at least one drive electrode and said at least one detection electrode is provided linearly on the surface of a vibratory body constituting said movable member such that electrodes of said set are orthogonal to each other, a wiring pattern for said drive electrode and said detection electrode is provided on the surface of a support beam, said support beam also constituting said movable member and the surface of an intervener connected thereto, said vibratory body is caused to vibrate in plane by Lorentz force generated when current passing through said at least one linear drive electrode passes through a magnetic field generated by one of a permanent magnet and magnetic field generator representing said detection/drive source, generation of a vibration in a plane orthogonal to the drive direction of said vibratory body is detected by detecting an induced electromotive force generated when said at least one linear detection electrode moves in the magnetic field generated by one of said permanent magnet and magnetic field generator representing said detection/drive source, and rotational angular velocity about an axis in a direction orthogonal to said junction surface is detected by acquiring the generation of the latter in-plane vibration.

6. A method of controlling position and posture of a vehicle using the inertia sensor recited in claim 5.

7. An inertia sensor comprising:
a sensing layer including a detector; and
an auxiliary layer fixed to said sensing layer through a junction surface,
wherein said sensing layer has a movable member and at least one detection electrode for detecting a displacement of said movable member;
said auxiliary layer has an opening formed therein at a position confronting said movable member; and
said movable member is displaceable in only a direction substantially parallel to the junction surface between said sensing layer and said auxiliary layer, wherein said movable member includes a vibratory body made of the same material as that of said sensing layer and support means also made of the same material as that of said sensing layer and operative to resiliently support said vibratory body.

8. An inertia sensor according to claim 7, wherein said vibratory body and said support means are provided inside a frame structure formed of the same material as that of said sensing layer, and the surface of any of said vibratory body, support means and frame structure is flush with the surface of said sensing layer.

9. An inertia sensor according to claim 8, wherein an electronic circuit section is provided for sensor operation at at least a part of the surface of said frame structure.

10. An inertia sensor according to claim 7, wherein said support means is at least one linear support beam having one end connected to said vibratory body.

11. An inertia sensor according to claim 7, wherein said support means is at least one or more L-shaped support beam having one end connected to said vibratory body.

12. An inertia sensor according to claim 7, wherein said support means includes at least one or more first linear support beam having one end connected to said vibratory body and an intervener connected to the other end of said first linear support beam, and said intervener is movably supported by means of at least one or more second linear support beam laid in a direction substantially orthogonal to said first linear support beam.

13. An inertia sensor according to claim 10, wherein said at least one support beam comprises first and second support beams having a substantially rectangular cross-sectional form in which a major side thereof is vertical to said junction surface and a minor side thereof is parallel to said junction surface.

14. An inertia sensor according to claim 7, wherein when a plurality of wiring patterns are provided on the surface of said support beams and intervener, a separate wiring pattern having constant ground potential is formed between different wiring lines.

15. An inertia sensor according to claim 14, wherein a main material of said sensing layer is silicon.

16. An inertia sensor according to claim 14, wherein said auxiliary layer is a glass substrate.

17. An inertia sensor comprising:
a sensing layer including a detector; and
an auxiliary layer fixed to said sensing layer through a junction surface,
wherein said sensing layer has a movable member and at least one detection electrode for detecting a displacement of said movable member;
said auxiliary layer has an opening formed therein at a position confronting said movable member; and
said movable member is displaceable in only a direction substantially parallel to the junction surface between said sensing layer and said auxiliary layer, wherein at least one electrical wiring pattern is formed on surfaces of a vibratory body and a support beam constituting said movable member, a mechanical distortion of said wiring pattern caused concomitantly with movement of said vibratory body is measured as a change in electrical resistance and in-plane acceleration of said vibratory body in a direction in which said vibratory body moves is detected by acquiring an amount of movement of said vibratory body from the electrical resistance change.

18. A method of fabricating an inertia sensor having a sensing layer including a detection portion and an auxiliary layer not including any detection portion and affixed to said sensing layer through a junction surface, comprising the steps of:
forming said sensing layer by providing a displacement member displaceable in a direction parallel to said junction surface and electrode means including drive electrodes and detection electrodes on at least a part of the surface of said sensing layer flush with the surface of said displacement member;
forming said auxiliary layer by providing a plate-like member, forming an opening of a larger area than that of said displacement member in said plate-like member and making said opening connected to the outside of said auxiliary layer through side surfaces thereof; and
bonding said sensing layer and said auxiliary layer to each other such that said opening in said auxiliary layer confronts said displacement member.

19. An inertia sensor fabricating method according to claim 18, wherein said sensing layer is formed by working a silicon wafer through semiconductor fabrication process, providing electrodes and a wiring pattern on the surface of said silicon wafer and providing a displacement member displaceable in a direction parallel to the junction surface;

said auxiliary layer is formed by providing a glass substrate, forming an opening of a larger area than that of said displacement member in said glass substrate through sandblast process and making said opening connected to the outside through side surfaces of said glass substrate; and bonding said auxiliary layer to the bottom of said sensing layer such that said opening in said auxiliary layer confronts said displacement member.

20. An inertia sensor fabricating method according to claim 19, wherein said glass substrate is made of low melting-point glass and the bonding is effected through fusion bonding process.

21. An inertia sensor fabricating method according to claim 19, wherein said glass substrate is made of Pyrex glass and the bonding is effected through anode bonding process between silicon glass members.

* * * * *